United States Patent
Popa et al.

(10) Patent No.: US 6,567,802 B1
(45) Date of Patent: May 20, 2003

(54) SYSTEMATIC APPROACH TO QUERY OPTIMIZATION

(75) Inventors: Lucian Popa, Morgan Hill, CA (US); Val Tannen, Philadelphia, PA (US); Alin Deutsch, Philadelphia, PA (US); Arnaud Sahuguet, Philadelphia, PA (US)

(73) Assignee: The Trustees of the University of Pennsylvania, Philadelphia, PA (US)

( * ) Notice: Subject to any disclaimer, the term of this patent is extended or adjusted under 35 U.S.C. 154(b) by 165 days.

(21) Appl. No.: 09/655,890

(22) Filed: Sep. 6, 2000

(51) Int. Cl.[7] .............................................. G06F 17/00
(52) U.S. Cl. ................................... 707/3; 707/2; 707/4
(58) Field of Search ...................... 707/1–206; 709/200, 709/100; 382/305

(56) References Cited

U.S. PATENT DOCUMENTS

| | | | | |
|---|---|---|---|---|
| 5,893,095 | A | * 4/1999 | Jain et al. ....................... | 707/6 |
| 5,911,139 | A | * 6/1999 | Jain et al. ....................... | 707/3 |
| 5,913,205 | A | * 6/1999 | Jain et al. ....................... | 707/2 |
| 5,915,250 | A | * 6/1999 | Jain et al. ..................... | 707/100 |

OTHER PUBLICATIONS

Cho et al., Specification and validation of dynamic systems using temporal logic, Software, IEEE Proceedings, vol. 148, Issue 4, Aug. 2001, pp. 135–140.*

Bandler et al., A generalized space–mapping tableau approach to device modeling, Microwave Theory and Techniques, IEEE Transactions on, vol. 49, Issue 1, Jan. 2001, pp. 67–79.*

Wijsen et al., Temporal tableau queries, Temporal Representation and Reasoning, 2001. Time 2001. Proceedings. Eighth International Symposium on, 2001, pp. 136–143.*

El–Baida et al., Automatic verification of concurrent object properties, Computer Systems and Applications, ACS/IEEE International Conference on, 2001, pp. 411–417.*

Abiteboul, S. et al, "Object Identity as a Query Language Primitive" in *Proceedings of ACM SIGMOD Conference on Management of Data*, Portland, Oregon: 159–173 (1989).

Abiteboul S., et al, *Foundations of Databases*, Addison–Wesley (1995).

Adali S., et al, "Query Caching and Optimization in Distributed Mediator Systems" *ACM SIGMOD*: 137–148 (1996).

Aho, A.V, et al, "The Theory of Johns in Relational Databases," *ACM Transactions on Database Systems*, 4(3):297–314 (1979).

(List continued on next page.)

*Primary Examiner*—David Jung
(74) *Attorney, Agent, or Firm*—Evelyn H. McConathy; Dilworth & Paxson LLC

(57) ABSTRACT

The present invention demonstrates the development and application of the chase/backchase ("C&B") technique to systematically optimize generating alternative query plans, aimed at multiple disparate targets. It further provides a first optimization prototype that uses path-conjunctive query graphs internally. The methods, systems, apparatus and techniques of the present invention capture and extend many aspects of semantic optimizations, physical data independence, use of materialized views and cached queries, as well as generalized tableau-like minimization. Moreover, using a uniform representation with constraints, the techniques make these disparate optimization principles highly cooperative.

This present invention provides a new class of optimization opportunities, such as the non-trivial use of indexes and materialized views enabled only by the presence of certain integrity constraints. Moreover, the technique is valuable when only the presence of semantic integrity constraints enables the use of physical access structures or materialized views.

20 Claims, 10 Drawing Sheets

OTHER PUBLICATIONS

Aho, A.V., et al, "Efficient Optimization of a Class of Relational Expressions," *ACM Transactions on Database Systems*, 4(4):435–454 (1979).

Atkinson, M. et al, "Design Issues in a Map Language", *Proc. of the 3rd Int'l Workshop on Database Programming Languages (DBPL91)*, Nafplion, Greece: 20–32 (1991).

Baker, B. "Responsible SQL: Creative Solutions for Performance Problems in DB2 for OS/390," *DB2 Magazine*, 4(2):54–55 (Summer 1999) http://www.db2mag.com/summer99/sp_prog.shtml.

Beeri, C., et al, "Algebraic Optimissation of Object Oriented Quesry Languages," *Theoretical Computer Science*, 116(1): 59–94 (1993).

Beeri, C., et al, "A Proof Procedure for Data Dependencies," *Journal of the ACM*, 31(4):718–741 (1984).

Bello, R. et al., "Materialized Views in Oracle," *Proc. of 24th VLDB Conference*: 659–664 (1998).

Bertino, E., *Query Processing for Advanced Database Systems*, "A Survey of Indexing Techniques for Object-Oriented Database Management Systems", Morgan Kauffman, San Mateo, CA: 383–418 (1994).

Bertino, E., et al, "Indexing Techniques for Queries on Nested Objects," *IEEE Trans. on Knowledge and Data Engineering*, 1(2): 196–214 (1989).

Cattell, R.G.G. ed. *The Object Database Standard, ODMG 2.0*. Morgan Kaufmann, San Mateo, California (1997).

Chakravarthy, U., J. Grant, and J. Minker, "Logic–Based Approach to Semantic Query Optimization," *ACM Transactions on Database Systems*, 15(2):162–207 (1990).

Chandra, A., et al, "Optimal Implemantation of Conjunctive Queries in Relational Data Bases", *Proceedings of 9th ACM Symposium on Theory of Computing*, Boulder, Colorado: 77–90 (1977).

Chaudhuri, S., et al, "Optimizing Queries with Materialized Views", *Proceedings of ICDE*, Taipei, Taiwan (1995).

Chen, C.M., et al, "The Implementation and Performance Evaluation of the ADMS Query Optimizer", *Proceedings of the International Conference on Extending Database Technology*: 1–21 (1994).

Cheng, Q., et al, "Implementation of Two Semantic Query Optimization Techniques in DB2 Universal Database" *Proc. of VLDB*: 687–698 (Sep. 1999).

Cherniack, M., et al, "Inferring Function Semantics to Optimize Queries" *Proc. of 24th VLDB Conference*: 239–250 (1998).

Cherniack, M., et al., "Rule Languages and Internal Algebras for Rule–Based Optimizers," *Proceedings of the SIGMOD International Conference on Management of Data*, Montreal, Quebec, Canada: 401–412 (1996).

Cluet, S., et al, "A General Framework for the Optimization of Object Oriented Queries," *Proceedings ACM–SIGMOD International Conference on Management of Data*: 383–392, San Diego, California (Jun. 1992).

Deutsch, A., et al, "Physical Data Independence, Constarints and Optimization with Univesal Plans" *VLDB*: 459–470 (Sep. 1999).

Fegaras, L., et al., "An Algebraic Framework for Physical oodb Design," *Proc. of the 5th Int'l Workshop on Database Programming Languages* (DBPL195), Umbria, Italy: 1–19 (Aug. 1995).

Florescu, D., et al, "A Methodology for Query Reformulation in CIS Using Semantic Knowledge," *International Journal of Cooperative Information System*, 5 (4): 1–36 (1996).

Graefe, Goetz, et al, "Extensible Query Optimization and Parallel Execution in Volcano," Freytag *et al.* ed., *Query Processing for Advanced Database Systems*, Chapter 11: 305–335 (1994).

Grant, J., et al, "Semantic Query Optimization for Object Database," *Proc. of the 13th Int'l Conference on Data Engineering* (Apr. 1997).

Iannidis, Y.E., et al, "Query Optimization by Simulated Annealing," Dayal *et al.*, eds., *Proceedings of ACM–SIGMOD International Conference on Management of Data*, San FRancisco 9–22 (May 1987).

Jarke M., et al, "An Optimizing Prolog Front–End to a Relational Query System," *Proceedings of ACM–SIGMOD*: 296–306 (1984).

Jeng P., et al, "Query Processing in Distributed Orion," *Proc. EDBT*, Venice, Italy: 168–187 (Mar. 1990).

Ke;;er, A.A., et al, "A Predicate–Based Caching Scheme for Client–Server Database Architectures," *Proceedings of the International Conference on Parallel and Distributed Information Systems* (1994).

Kemper, A., et al, "Access Support Relations in Object Bases" *Proceedings of the ACM–SIGMOD International Conference on Management of Data*: 364–374 (1990).

Levy, A., et al, "Answering Queries Using Views" *Proceedings of PODS*: 95–104 (1995).

Levy, A., D. Srivastava, and T. Kirk, "Data Model and Query Evaluation in Global Information Systems," *Journal of Intelligent Information Systems*: 1–23 (1995).

Libkin, L., et al, "A Query Language for Multidimensional Arrays: Design, Implementation and Optimization Techniques," *SIGMOD Proceedings, Int'l Conf. on Management of Data* 228–239 (1996).

Lohman, G.M., et al, "Extension to Starburst: Objects, Types, Functions, and Rules," *Communications of the ACM* 34(10): 94–109 (Oct. 1991).

Maier, D., et al, "Indexing in an Object–Oriented DBMS" *Proceedings of 2nd International Workshop on Object–Oriented Database Systems*: 171–182, Asilomar, CA (Sep. 1986).

Nelson, Greg, et al, "Fast Decision Algorithms Based on Union and Find" *FOCS*: 114–119 (Nov. 1977).

Papakonstantinou, Y., et al, "Object Exchange Across Heterogeneous Information Sources" *Proceedings of IEEE International conference on Data Engineering*: 1–26 (Mar. 1995).

Papakonstantinou, Y., et al, "Capabilities–Based Query Rewritting in Mediator System," *Distributed and Parallel Database*, 6 (1) (1998).

Popa, L., et al, "Chase for Path–Conjunctive Queries, Constarints, and Views" in *Proceedings of ICDT, Jerusalem, Israel*: 1–19 (Jan. 1999).

Popa, L., et al, "Chase and Axioms for PC Queries and Dependencies," *Technical Report MS–CIS–98–34*, University of Pennsylvania http://www.cis.uppen.edu/techreports: 1–43 (1998).

Qian, X., "Query Folding" *Proceeding ICDE*: 48–55 (1996).

Rajarman, A., *et al*, "Answering Queries Using Templates with Binding Patterns (Extended Abstract)" in *Proc. 14th ACM Symposium in Principles of Database System*: 105–112 (1995).

Selinger, P.G., et al, "Access Path Selection in a Relational Datbase Management System," *Proceedings of ACM SIGMOD International Conference on Management of Data*: 23–34, (1979) Reprinted in *Reading in Database System*, Morgan Kaufmann (1988).

Shaw, G., et al, "Object–Oriented Queries: Equivalence and Optimization," *Proceedings of International Conference of Deductive and Object–Oriented Datbases* (1989).

Shaw, G., et al, "Object–Oriented Query Algebra," *Proc. DBPL*, Salishan Lodge, Oregon: 103–112 (Jun. 1989).

Steinrunn, M., et al, Heuristic and Randomized Optimization for the Join Ordering Problem. *VLDB Journal*, 6(3): 191–208 (1997).

Tsatlos, O., et al, "The GMAP: A Versatile Tool for Physical Data Independence," *Proc. of $20^{th}$ VLDB Conference*, Santaigo, Chile: 1–28 (1994).

Valduriez, P., "Join Indices," *ACM Trans. Database Systems*, 12(2):218–246 (Jun. 1987).

Wiederhold, G., "Mediators in the Architecture of Future Information Systems," *IEEE Computer*: 38–49 (Mar. 1992).

Yang, H.Z., et al, "Query Transformation for PSI–queries" *Proceedings of the $13^{th}$ International VLDB Conference*: 245–254 (1987).

* cited by examiner

SYSTEMATIC APPROACH TO QUERY OPTIMIZATION

BACKGROUND OF THE INVENTION

Many investigators have studied semantic query optimization for relational systems (e.g., Cheng et al, In *Proceedings of VLDB*, pg 687–698 (September 1999); Grant et al., In *Proceedings of ICDE* (1997); Chakravarthy et al., *AC Transactions on Database Systems*, 15(2):162–207 (1990), and the references cited therein). The techniques most frequently used, include: index introduction, joint elimination, scan reduction, join introduction, predicate elimination and detection of empty answers (Grant et al., 1997).

Both Tsatlos et al. (In *Proceedings of 20$^{th}$ VLDB Conf.*, Santiago, Chile (1994)) and Fegaras et al. (In *Proceedings of the 5$^{th}$ Int'l Workshop on Database Programming Languages* (DBPL195), Umbria, Italy (1995)) have developed special constructs and types for representing physical structures, but the operations on them that can be used in a query plan (e.g., joins or comprehensions) do not explicitly distinguish them from relations/complex values. Research efforts investigating physical data independence as the central issue or closely related problems, have all recognized physical data independence as an optimization problem, that is how does one rewrite a query $Q(\Lambda)$ written against a logical schema $\Lambda$ into an equivalent query plan $Q'(\Phi)$ written against a physical schema $\Phi$, given a semantic relationship between $\Lambda$ and $\Phi$. See, Chaudhuri et al., In *Proceedings of ICDE*, Taipei, Taiwan (1995); Levy et al., In *Proceedings of PODS* (1995); Chen et al., In *Proceedings of the Int'l Conf. on Extending Database Technology* (1994); Yang et al., In *Proceedings of the 13$^{th}$ Int'l VLDB Conf.* pg 245–254 (1987)); Keller and Basu, In *Proceedings of the Int'l Conference on Parallel and Distributed Information Systems*, 1994; Levy et al., In *Proceedings of PODS*, 1995; Qian, In *Proceeding ICDE*, pg 48–55, 1996; Rajarman et al., In *Proceedings 14$^{th}$ ACM Symposium In Principles of Database System*, pg 105–112 (1995); Fegaras et al., In *Proceedings of the 5$^{th}$ Int'l Workshop on Database Programming Languages* (*DBPL95*), Umbria, Italy (1995); Tsatlos et al., (1994); Yang et al., In *Proceedings of the 13$^{th}$ Int'l VLDB Conference*, pg 245–254 (1987).

Conventional relational optimization methods (Selinger et al., In *Proceedings of ACM SIGMOD Int'l Conference on Management of Data*, pg 23–34, 1979, Reprinted in *Reading in Database System*, Kaufmann, 1988), such as selection pushing and join reordering, have long relied on ad-hoc heuristics for introducing indexes into a plan. Gmaps (Tsatlos et al., 1994) have been proposed as an alternative, as have studies into object-oriented data independence (Kemper et al., In *Proceedings of ACM SIGMOD Internat'l Conf. on Management of Data*, pg 264–374 (1990), and into distributed, mediator-based systems (Wiederhold, *IEEE Computer*, pg 38–49 (1992) for information integration. However, the previously reported techniques (Chaudhuri et al., 1995; Levy et al., 1995; Qian, 1996; Rajarman et al., 1995) are neither general enough, nor flexible enough, to be adapted to the current problems.

Chase transformation was originally defined for conjunctive (tableau) queries and embedded implicational dependencies. Popa and Tannen (In *Proceedings of ICDT*, Jerusalem, Israel, January 1999) generalized the classical relational tableau chase procedure (Beeri et al., *Journal of the ACM* 31(4):718–741 (1984)) to work for the object-oriented model and dictionaries, and for dependencies that capture a large class of semantic constraints including referential integrity constraints, inverse relationships, nested functional dependencies, etc. Moreover, they have shown that classical tableau minimization (Chandra and Merlin, In *Proceedings of 9$^{th}$ ACM Symposium on Theory of Computing*, pg 77–90, Boulder, Colo., (1977; Aho et al., *ACM Transactions on Database Systems*, 4(4):435–454 (1979) can be generalized correspondingly, as chasing with "trivial" (always true) constraints.

Limited use of the chase to path-conjunctive queries and dependencies, presented by Popa and Tannen, 1999, permit the capture of object-oriented queries and queries against Web-like interfaces described by dictionary (finite function) operations. Dictionaries also describe many physical access structures, giving succinct declarative descriptions of query plans, in the same language as the queries. Subsequently, Deutsch et al, in *VLDB* (September 1999), showed that the elements of the implementation mapping (physical access structures, materialized views, etc.) are uniformly captured by the same kind of constraints and that can use the chase (forwards and backwards) to find the solutions of the equation mentioned above.

Although in an earlier manuscript, Jarke et al., In *Proceedings of ACM-SIGMOD*, pg 316–325 (1984), described chasing with functional dependencies, tableau minimization and join elimination with referential integrity constraints, surprisingly few experimental results are actually reported in the prior art. Grant et al., (1997) report on join elimination in star queries that are less complex than the present experiments with EC2. Examples of SQO for OO systems appear in Beeri et al., *Theoretical Computer Science*, 116(1):59–94 (1993); Cherniack. et al., In *Proceedings of 24$^{th}$ VLDB Conf.*, pg 239–250 (1998); Fegaras et al., 1995); and Grant et al., 1997. A general framework for SQO using rewrite rules that are expressed using OQL appears in the work of Florescu, "Design and implementation of the Flora Object Oriented Query Optimizer," PhD thesis, Universite of Paris (1996), and Florescu et al., *Int'l Journal of Cooperative Information Systems* 5(4) (1996).

Techniques for using materialized views in query optimization are discussed in the works of Chaudhuri, et al., 1995), both Florescu manuscripts (1996); Tsatalos et al., *VLDB Journal* 5(2):101–118 (1996) and Bello et al., In *Proceedings of 24$^{th}$ VLDB Conf*, pg 659–664 (1998). Also relevant is the work on join indexes by Valduriez, *ACM Trans. Database Systems*, 12(2):218–452 (1987), and on precomputed access support relations by Kemper et al., In *Proceedings of ACM-SIGMOD Int'l Conf on Management of Data*, pg 364–374 (1990).

However, the problem remains of how to optimize queries aimed at disparate targets, particularly in complex situations. The general problem is forced by data independence, i.e., how to reformulate a query written against a "user"-level schema into a plan that also/only uses physical access structures and materialized views efficiently. The gmap approach (Tsatalos et al., 1996) works with a special case of conjunctive queries (PSJ queries). The core algorithm is exponential, but the restriction to PSJ is used to provide polynomial algorithms for the steps of checking relevance of views and checking a restricted form of query equivalence. However, in light of current findings, there is no measurable practical benefit from all these restrictions.

Moreover, the schemas, views and queries of Chaudhuri et al., 1995; Tsatalos et al., 1996; and Yang et al., 1987, lack significant complexity. Their experiments show that using views is possible, and in the case of Tsatalos et al., 1996, that it can produce faster plans. However, Yang et al. measured only optimization time, and Tsatalos et al. did not separate the cost of the optimization itself. Consequently, they do not offer value that can be compared with time reduction. Although Chaudhuri et al. showed a very good behavior of the optimization time as a function of plans produced, the findings are ineffective because the use of bag semantics restricts variable mappings to isomorphisms, thus greatly reducing the search space.

Deutsch et al. 1999, recently demonstrated the promising potential of the chase and backchase technique (C&B), but raised the natural question: Is this technique practical? This raises two sets of issues that until the present invention remained unanswered in the art:

1. Are these feasible implementations of technique? In particular:
    (a) Is the chase phase feasible, given that even determining if a constraint is applicable requires searching among exponentially many variable mappings?
    (b) Is the backchase feasible, given that even if each chase or backchase step is feasible, the backchase phase may visit exponentially many subqueries?
2. Is the technique worthwhile? That is, considering the significant cost of C&B optimization, is the cost of an alternative plan based only on the C&B technique, still better than the cost of a plan without C&B?

SUMMARY OF THE INVENTION

The present invention, also as set forth by Deutsch et al, in *VLDB* (September 1999) and Popa et al., In *Proceedings of the 2000 ACM SIGMOD Int'l Conf. on Management of Data* (May 2000) (each of which are herein incorporated by reference), amply demonstrates the development and application of the chase/backchase technique to systematically optimize generating alternative query plans, aimed at multiple disparate targets. It further provides a first optimization prototype that uses path-conjunctive query graphs internally.

The optimization method of this invention is referred to as the "C&B technique," referring to chase and backchase, the two principal phases of the optimization algorithm. The optimization is complete and specified by a set of constraints, including constraints that capture physical access structures and materialized views. In the first phase, the original query is chased using applicable constraints into a universal plan that gathers all of the pathways and structures that are relevant for the original query and the constraints used in the chase. In the second phase, navigation through these subqueries is done by chasing backwards, trying to eliminate joins and scans. The search space for optimal plans consists of subqueries of this universal plan, and the size of the search space is advantageously reduced by "stratifying" the sets of constraints used in the backchase. Each backchase step needs a constraint to hold, and the algorithm checks to confirm that it follows from the existing ones. Thus, the entire C & B technique is captured by constraints, and by only two generic rules.

The technique is definitely feasible for practical schemas and queries. The present invention shows that by using congruence closure and a homomorphism pruning technique, the chase can be implemented effectively in practice. The method efficiently and effectively reduces the size of either the query or the constraint set to overcome the problem presented when the backchase quickly becomes impractical when both query complexity and the size of the constraint set are increased. The inventive strategies will not only work in common situations, but that they are also complete for the case of path-conjunctive materialized views.

The method and techniques of the present invention capture and extend many aspects of semantic optimizations, physical data independence (use of primary and secondary indexes, join indexes, access support relations and gmaps), use of materialized views and cached queries, as well as generalized tableau-like minimization. Moreover, and most importantly, using a uniform representation with constraints (dependencies), the techniques make these disparate optimization principles cooperate easily. This presents a new class of optimization opportunities, such as the non-trivial use of indexes and materialized views enabled only by the presence of certain integrity constraints. The technique is valuable when only the presence of semantic integrity constraints enables the use of physical access structures or materialized views.

The C&B technique covers index and join introduction and, in fact, extends them by trying to introduce any relevant physical access structure. The technique also covers join elimination (at the same time as tableau-like minimization) as part of subquery minimization during the backchase.

In a embodiment of the invention, there is provided a method of systematically optimizing the processing of a query in a database management system that operates in a computer network, wherein the method comprises a) receiving the executable data query; b) producing a query plan by applying to the query a relational tableau chase procedure comprising logical constraints which capture all relevant elements for implementation mapping of the query; c) rewriting the query against a logical schema into an equivalent universal query plan written against a physical schema, given a semantic relationship between the logical schema and the physical schema that explicitly uses all relevant physical structures in the implementation; d) applying to the universal plan a sequence of backchase steps, which systematically combine use of indexes, materialized views, semantic optimization and minimization, to remove redundancies, joins and scans; e) generating an alternative cost-based optimal query plan; and f) executing the optimal query plan.

In another embodiment of the method of the present invention, the chase step utilizes applicable constraints to gather all path-conjunctive queries and physical access structures relevant to the original query. In yet another embodiment of this method, backchase step comprises removing data from the logical schema that is not in the physical schema. In a further embodiment of the method, the size of the search space for the backchase step is minimized by reducing the size of the query, comprising fragmenting the query and stratifying the constraints by relevance to each fragment. The size of the search space for the backchase step is also minimized in an additional embodiment, by reducing the size of the constraint set, comprising splitting the constraints independent of the query.

In an alternative embodiment of the method of the present invention, the size of the search space for the backchase step is minimized by reducing the size of both the query and the constraint set by partitioning into independent subparts, comprising (i) fragmenting the query and stratifying the constraints by relevance to each fragment, and (ii) splitting the constraints independent of the query.

Also provided in an embodiment of the invention is a database management system, comprising a) a database having a plurality of records; b) means for accessing and rewriting a query into a universal plan in accordance with a tableau chase procedure based on declarative constraints; c) an optimizer for optimizing a query accessing said relational database, by rewriting with the tableau chase procedure the query into a universal plan, followed by a sequence of backchase procedure steps based in part on declarative constraints which eliminate redundancies in the universal plan to reduce cost; wherein the rewrite rules are expressed in a high-level declarative language, which is an extension of ODMG/ODL and ODMG/OQL, and the query against a logical schema is rewritten into an equivalent universal query plan written against a physical schema, given a semantic relationship between the logical schema and the physical schema; wherein said optimizer uses said rewrite rules to generate query plans that are minimal in the number of scans and joins it performs; d) means for applying to said minimal query plans any cost-based query optimization procedure to produce a globally optimal plan; and e) means for executing said optimal plan.

In another embodiment of the present invention, there is provided a query optimization system for systematically optimizing a query invoking database tables, wherein the system comprises a) means for providing a high-level declarative language, which is an extension of ODMG/ODL and ODMG/OQL, and declarative chase and backchase rules to rewrite a query written against a logical schema into an equivalent universal query plan written against a physical schema, given a semantic relationship between the logical schema and the physical schema; b) means for generating alternative queries from the query and rewrite rules; c) means for generating query plans that is minimal in the number of scans and joins it performs; d) means for applying to said minimal query plans any cost-based query optimization procedure to produce a globally optimal plan; and e) means for executing this optimal plan.

In another embodiment of the present invention, there is provided an apparatus for use in systematically optimizing a query in a database system, wherein the apparatus comprises a) memory for storing at least one data item referenced by the query; b) and a processor coupled to the memory and operative to (i) systematically apply to the query a tableau chase procedures and a sequence of backchase procedure steps based in part on declarative constraints along with one or more algebraic rewritings based on explicit substitutions in order to generate a rewritten universal query plan and rewritten query plans that are minimal in the number of scans and joins performed, which are equivalent to the query, wherein each of at least a subset of equivalent substitutions represents a hypothetical database change; (ii) applying to the minimal query plans any cost-based query optimization procedure to produce a globally optimal plan; and (iii) execute this optimal plan.

Additional objects, advantages and novel features of the invention will be set forth in part in the description, examples and figures which follow, and in part will become apparent to those skilled in the art on examination of the following, or may be learned by practice of the invention.

DESCRIPTION OF THE DRAWINGS

The foregoing summary, as well as the following detailed description of the invention, will be better understood when read in conjunction with the appended drawings. For the purpose of illustrating the invention, there are shown in the drawings embodiment(s) which are presently preferred. It should be understood, however, that the invention is not limited to the precise arrangements and instrumentalities shown.

FIG. 6A shows the time to chase in ECI with regard to the number of indexes. FIG. 6B shows the time to chase in EC2 with regard to the size of the query. FIG. 6C shows the time to chase in EC3 with regard to the number of classes.

DETAILED DESCRIPTION OF THE INVENTION

Figure 1:
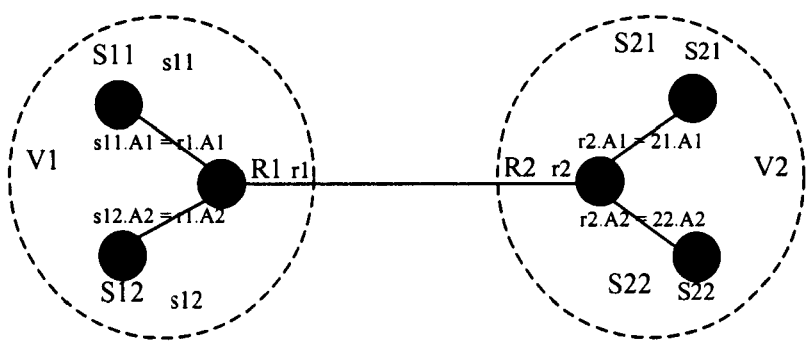
FIG. 1 is a diagram depicting the join graph or query graph of Q, in which the nodes represent the query variables, and the edge represents equijoins between them.

Optimizations have become increasingly relevant as more queries are generated automatically by mediator tools in heterogeneous applications, while materialized views are increasingly used in dealing with source capabilities, security, encapsulation and multiple layers of logical/physical separation. The present invention provides methods and techniques to systematically capture and extend many aspects of semantic optimizations, physical data independence (including use of primary and secondary indexes, join indexes, access support relations and gmaps), use of materialized views and cached queries, as well as generalized tableau-like minimization. Using a uniform representation with "constraints" (dependencies), the techniques make these disparate optimization principles "cooperate" easily, thereby presenting a new class of optimization opportunities, such as the non-trivial use of indexes and materialized views enabled only by the presence of certain integrity constraints.

The optimization method of the present invention is referred to as the "C&B technique," referring to chase and backchase, the two principal phases of the optimization algorithm. Part I of the following description is directed to the theoretical development of the optimization algorithm, and to the many disparate elements that systematically interact in the present invention to provide a new class of optimization opportunities. Part II describes the implementation of the optimization method presented in Part I for a variety of schemas and queries to demonstrate the practicality and effectiveness of the invention. The experimental results that follow Part II demonstrate that the present method is practical (i.e., feasible and worthwhile).

A relational database management system is a computer-implemented database processing system that relies upon relational techniques for storing and retrieving data. Data in the form of tables ("relations") are typically stored on disk drives or in other mass storage data stores. A "relation" includes a set of rows (formally denominated "tuples" or "records") spanning several columns (formally denominated "attributes"). Each "attribute" in a relation includes "restrictions" on the data contents thereof, which may include designation as a primary or foreign key. However, a "tuple" expresses a mathematical relation between its "attributes" (column elements), while a "record" does not.

A relational database processing system is structured to accept commands to store, retrieve and delete data using high-level query languages, such as the Structured Query Language (SQL), and variations thereon. As used herein, a "query" refers to a set of user commands for retrieving data from a stored database. The query language requires the return of a particular data set (relation) in response to a particular query, but the method of query execution employed by the database management system is not specified by the query. The method of query execution is denominated the query "plan," specifically a "universal query plan," and there are typically many different useful plans for any particular user query, each of which returns the required data set. For large databases, the plan selected to execute a query must provide the required data return at a reasonable cost in time and hardware resources. Most relational database systems include a query compiler or engine to translate queries into a plan, which includes an optimizer to select an efficiently executable plan.

Until the present invention, it had been assumed implicitly that the query engine would evaluate the joins and comprehensions over special constructs and physical structures in ways that would take advantage of their physical efficiency. However, the present invention operates differently. In the present technique, such structures are represented explicitly, mainly using dictionary data structures (functions with a finite domain expressible in the language). This is a construct that directly reflects the efficiency of its representation through a fast lookup operation that appears in query plans. In fact, dictionaries represent in a natural fashion, physical structures, such as primary and secondary indexes, extent-based representations of OO classes, join indexes (see, Valduriez, *ACM Trans, Database system* 12(2) :218–452 (1987)), path indexes (see, Maier et al., In *Proceedings of 2$^{nd}$ Int'Workshop on Object-Oriented Database Systems*, pg 71–182, Asilomar, Calif. (1986)), access support relation (see, Kemper et al., 1990), gmaps (see, Tsatlos et al., 1994), etc. The physical level is represented, just like the logical level, with a typed data definition language and with constraints.

The constraints that capture the implementation mapping in the present invention are of two kinds. The first kind applies the chase to the original query, introducing explicitly the physical schema structures. Some semantic constraints work in the same way introducing structures that are alternatives to the ones mentioned in the original query. Chasing with these constraints results in a query "plan," called a "universal plan" because it is an amalgam of all the query plans allowed by the constraints. In the second phase the chase is applied backwards from the universal plan, trying to simplify the plan by removing structures, in particular some or all of the structures mentioned in the original query. The soundness of each such backchase step relies again on a constraint, and must be tested to determine whether the constraint is implied by the existing ones. This is where the second kind of constraints capturing the implementation mapping is used. This is also where minimization is applied, by testing for trivial constraints.

An additional important contribution of the present invention is the systematic procedure for considering all alternate plans enabled by indexes and other physical access structures. The present method is complete, i.e., finds the query plans that are minimal in a precise sense, for "path-conjunctive" (PC) queries and physical access structures (implementation mappings). An important restriction is that no constraint beyond those describing the implementation mappings are allowed. Nevertheless, the PC queries and PC physical structures of the present method are more general and expressive than those considered in previous works.

Part I. The Optimization Algorithm
Language, Logic Schema, Physical Schema and Query The language used to express the theoretical aspects of the present invention began with a different formalism, one in which it was easier to see the interaction between queries and constraints and the governing equivalence laws, and in fact, an efficient internal representation of the queries would be different yet. However, to facilitate presentation, the well-known syntax of ODMG/OLD and ODMG/OQL (Cattell, ed., *The Object Database Standard: ODMG* 2.0. Morgan Kaufmann, San Mateo, Calif., 1997) will be used (extended with a few constructs) for both logical and physical schema and queries. ODL already has a type of dictionary Dict($T_1$, $T_2$), with keys of type $T_1$, and $T_2$ of type $T_2$, and OQL already has M[k], the "lookup" operation that returns the entry corresponding to the key k in the dictionary M, provided that M is defined for k.

In practice, for dictionaries with set-value entries, one often assumes the existence of a "non-failing lookup" operation that return the empty set, rather than failing when k is not defined for M. This physical operation is denoted herein by M[k]. To this is added the operation dom M that returns the "domain" of the dictionary M, i. e., the set of keys for which M is defined and a dictionary construction operation, described below.

For example, the following "logical" schema is written following mostly the syntax of ODL, the data definition language of ODMG, extended with referential integrity (foreign key) constraints in the style of data definition in SQL.

Proj: Set<Struc{ class Dept
   string PName; (extent depts key DName){
   string CustName; attribute string DName;
   string PDept; relationship Set<string> DProjs
   string Budg;}> inverse Proj(PDept);
primary key PName; attribute string MgrName;}
foreign key PDept foreign key DProjs
   references Dept::Dname; references Proj(PName);
relationship PDept
   inverse Dept::DProjs;

The schema consists of a class Dept, and a relation Proj. The schema has referential integrity (RIC), inverse relationship, and key constraints, whose meaning can be specified by the following assertions.

(RIC1) $\forall$(d $\in$ depts)$\forall$(s $\in$ d.DProjs)
   $\exists$(p $\in$ Proj)s=p.PName
(RIC2) $\forall$(p $\in$ Proj)$\exists$(d $\in$ depts)p.PDept=d.DName (INV1) $\forall(d \in depts)\forall(s \in d.DProjs)\forall(p \in Proj)$
  $(s=p.PName \rightarrow p.PDept.=d.DName$ (INV2) $\forall(p \in Proj)\forall(d \in depts)$
  $(p.Pdept=d.DName \rightarrow \exists s \in d.DProjs)p.PName=s)$ (KEY1) $\forall(p \in depts)\forall(d' \in depts)$
  $(d.DName=d'.DName \square d.=d')$ (KEY2) $\forall(p \in Proj)\forall(p' \in Proj)$
  $(p.DName=p'.DName \rightarrow p.=p')$ Consider also the following OQL query Q that asks for all project names, with their budgets and department names, that have a customer called "CitiBank":

Select distinct struct (PN: s,PB: p.Budg,DN: d.DName)
from depts d, d,DProjs s, Proj p
where s=p.PName and p.CustName="CitiBank"

Since the present invention relies only on set semantics, the keyword distinct is omitted.

The example is continued in the following physical schema:

Dept: Dict(Doid, Struct{string DName;
  Set(string) DProjs;
  string MgrName})
Proj: Set(Struct{string PName; string CustName;
  string Pdept; string Budg})
I: Dict(string, Struct{string PName; string CustName;
  string Pdept; string Budg})
SI: Dict(string, Set(Struct{string PName: string CustName;
  string Pdept; string Budg}))
JI: Set(Struct{Doid DOID; string PN})

In the present approach an OO class must have an extent, and is represented as a dictionary whose keys are the oids, whose domain is the extent, and whose entries are records of the components of the objects. To maintain the abstract properties of oids, no assumptions are made about their nature, and fresh new base types are invented for them (see, e.g., "DOID" in the exemplified physical schema above, for "Dept," wherein the dictionary is the same as the class). This representation actually corresponds to the usual semantics of OODB constructs (Abiteboul et al., In *Proceedings of ACM SIGMOD Conf on Management of Data*, pg 159–173, Portland, Oreg. (1989)). The syntax of queries and that of query plans are very close. For example, if d is an oid in "depts," the implicit de-referencing in "d.Dname" corresponds to the dictionary lookup in "Dept[d].DName." The relation "Proj," stored as a table (a set of records), is also part of the physical schema, which therefore, is not disjoint from the logical. This is a common situation.

In addition, it is assumed that the following indexes are maintained: a primary index I on the key "Pname" of relation "Proj," and a secondary index "SI" on "CustName" of relation "Proj." An index could also have been added between the key "Dname" and the extent of "Dept," but it was not needed for the example. Both indexes are represented by dictionaries. For example, I[s] returns the record r in "Proj" such that "r.PName=s." Similarly, SI[c] returns the set of records r in "Proj" such that "r.CustName=c." In an implementation r may represent a set of record ids, rather than a set of records (if SI is not a clustered index). This is also the case for the primary index. However, since this would introduce an additional level of indirection, the election has been made not to show it here, for simplicity of presentation.

Finally, the physical schema materializes the physical access structure defined by:

(JI) select struct(DOID: d, PN: p.PName)
from depts d, d.DProjs s, Proj p
where s=p.Pname Note that JI is both a generalized access support relation (see, Kemper et al., 1990) and a generalized join index (see, Valduriez, 1987), since it involves a relation and a class.

Continuing with this physical schema, with the implementation mapping understood from the preceding discussion, and especially with the constraints specified in the logical schema, four examples of the previously described query plans for the query Q are presented:

($P_0$) select struct(PN: s, PB: p.Budg,
  DN Dept[d].DName)
  from dom Dept d, Dept [d].DProjs s, Proj p
  where s=p.PName and
  p.CustName="CitiBank"

($P_1$) select struct(PN: p.PName, PB: p.Budg,
  DN: p.PDept)
  from Proj p
  where p.CustName="CitiBank"

($P_2$) select struct(PN: p.PName, PB: p.Budg,
  DN: p.PDept)
  from SI["CitiBank"]p ($P_3$) select struct(PN: j.PN, PB: I[j.PN].Budg,
  DN: p.Dept)
  from JI j
  where I[j.PN].CustName="CitiBank"

$P_1$ simply introduces the representation of the class as a dictionary, and its cost is essentially that of Q, but the other three are potentially significantly better. Depending on the cost model (especially in a distributed heterogeneous system), either one of $P_1$, $P_2$, or $P_3$, may be cheaper than the other two. As will be seen, however, although they are quite different in nature, the optimization algorithm of the present invention generates all three.

Modeling Physical Structures as Constraints

OQL does not have an operation that constructs a dictionary. Therefore, to permit implementation mappings involving dictionaries to be written, it is extended in the present algorithms with the following syntax "dict x in $Q \rightarrow Q'(x)$" denoting the dictionary with domain Q, and that associates to an arbitrary key x, the entry $Q'(x)$. The notation $Q'(x)$ reflects the fact that Q'is an expression in which the variable x may occur free.

Indexes and Classes. In the previous operation the definition of primary and secondary indexes, such as I and SI, can be explicitly defined, for example:

$I^{def}$ dict k in $\Pi_{pName}(Proj) \rightarrow$
  element(select p from Proj p where p.PName=k)
$SI^{def}$ dict k in $\Pi_{CUSTName}(Proj) \rightarrow$
  (select p from Proj p where p.CUSTName=k)

$\Pi_A$ (R) is a shorthand for the query that projects relation R on A, and element (C) is the OQL operation that extracts the unique element of the singleton collection C, and which fails if C is not a singleton. Fortunately, the use of constraints makes this messy operation unnecessary. In the present invention, both the primary and secondary indexes are completely characterized by constraints, e.g., for I, the terms PI1, PI2 are used, and for SI, the terms SI1, SI2, SI3 are used where:

(PI1) $\forall(p \in Proj)\exists(i \in dom\ I)$
  i=p.PName and I[i]=p
(PI2) $\forall(i \in dom\ I)\exists(p \in Proj)$
  i=p.PName and I[i]=p (SI1) $\forall(p \in Proj)\exists(k \in dom\ SI)\exists(t \in SI[k])$
  $k=p.CustName$ and $p=t$
(SI2) $\forall(k \in dom\ SI)\forall(t \in SI[k])\exists(p \in Proj)$
  $k=p.CustName$ and $p=t$
(SI3) $\forall(k \in dom\ SI)\exists(t \in SI[k])$true Notice that each (PI1, PI2, SI1, SI2) is an inclusion constraint, while (SI3) is a non-emptyness constraint. In fact, taken together, the pairs of inclusion constraints also state inverse relationships between the dictionaries and Proj. Similarly, the relationship between the class Dept and the dictionary implementing it, Dept, can be represented with two constraints. The following represents one of them (while the other is "inverse"):

$(\delta_{Dept})$ $\forall(d \in depts)\forall(s \in d.DProjs)$
  $\exists(d'\ dom\ Dept)\exists(s' \in Dept[d'].DProjs)$
  $d=d'$ and $s=s'$ Hash Tables. An interesting extension to this idea are hash tables. A hash table for a relation can be viewed as a dictionary in which keys are the results of applying the hash function to tuples in the relation, while the entries are the buckets (sets of tuples). Thus, a hash table can be represented similarly to secondary indexes. A hash table differs from an index, because it is not usually materialized, however a hash-join algorithm would have to compute it on the fly. In the present invention, join queries can be rewritten into queries that correspond to hash-join plans, provided that the hash-table exists, in the same way that queries are rewritten into plans that use indexes. The mechanics of such a conversion are well within the understanding of one of ordinary skill in the art.

Materialized views/Source Capabilities. Materialized conjunctive or PSJ (project-select-join) views, or cached results of conjunctive/PSJ queries over a relational scheme R have been used in answering other conjunctive/PSJ queries over R (Chaudhuri 1995; Levy et al, 1995; Qian, 1996; Chen et al, 1994; Yang et al., In *Proceedings of the 13th Int'l VLDB Conf.* pg 245–254 (1987)). In a more general form this is:

$V^{def}$ select $O(\vec{x})$ from $\vec{P}\ \vec{x}$ where $B(\vec{x})$

An arbitrary sequence of binding $P_1, x_1, \ldots, P_n, x_n$, is denoted by $\vec{P}\ \vec{x}$, while $O(\vec{x})$ is used to denote the fact that variables $x_1, \ldots, x_n$ can appear in output record O (and similar for $B(\vec{x})$). Like indexes, such structures can be characterized by constraints, namely:

$\delta_V^{def}\forall(\vec{x} \in \vec{P})[B(\vec{x}) \rightarrow \exists(v \in V)O(\vec{x})=V]$ $\delta'_V^{def}\forall(v \in V)\exists(\vec{x} \in \vec{P})[B(\vec{x})$ and $O(\vec{x})=v]$ Note that $\delta V$ corresponds to the inclusion select $O(\vec{x})$ from $\vec{P}\ \vec{x}$ where $B(\vec{x})\ C\ V$, while $\delta'_v$ corresponds to the inverse inclusion. The two are, in general, constraints between the physical and the logical schema.

For example, JI is expressed as such a view and (although $\delta'_{JI}$ is not shown) $\delta'_{JI}$ is:

$(\delta'_{JI})\forall(d \in depts)\forall(s \in d.DProjs)\forall(p \in Proj)$
  $(s=p.PName \rightarrow \exists(j \in JI)j.DOID=d$
  and $j.PN=p.PName)$ Source capabilities often used in information integration systems can be described by either such materialized views or by dictionaries modeling the binding patterns of Rajarman, 1995.

Join indexes. Join indexes (JI), introduced (Valduriez, 1995) as a technique for join navigation, were shown to outperform even hybrid-hash join in most cases with high join selectivity. The technique assumes that tuples have unique, system-generated identifiers called surrogates (if the relations have keys, these can be used instead), and that the relations are indexed on surrogates. A join index for the join of relations R and S, denoted JRs, is a pre-computed binary relation associating the surrogates of R-tuples to surrogates of S-tuples whenever these tuples agree on the join condition. The join is computed by scanning $J_{RS}$ and using the surrogates to index into the relations. Therefore, a join index is fully described by a tuple, consisting of a materialized binary relation view and two indexes. In the preceding example, the join index for joining "Dept" with "Proj" consists of the materialized view JI, the class Dept and the primary index I.

Access support relations. ASR (Kemper et al., 1990; Kemper et al., In Proceedings *VLDB*, Brisbane, Australia (1990)) generalize path indexes (Maier, 1086; Bertino in *A Survey of Indexing Techniques for Object-Oriented Database Management Systems*, pg 383–418, Morgan Kauffmann, San Mateo, Calif. (1994); Bertino et al., *IEEE Trans. on Knowledge and Data Engineering* 1(2) (1989)), and translate the join index idea from the relational to the object model, generalizing it from binary to n-ary relations. An access support relation (ASR) for a given path is a separate pre-computed relation that explicitly stores the oids of objects related to each other via the attributes of the path. As with join indexes, ASRs are used to rewrite navigation style path queries to queries which scan the access support relation, project out the oids of the source and target objects for the path and de-reference these oids to access the objects.

The oid de-referencing operation is performed implicitly in OQL, which therefore can express this algorithm, but fails to express its join index based relational counterpart because of the lack of explicit dictionary lookup operations. In the present invention, however, the approach, access support relations and join indexes are unified using dictionaries both for representing classes with extents and indexes. Analogous to join indexes, access support relations are modeled for a given path as the materialized relation storing the oids along the path, together with the dictionaries modeling the classes of the source and target objects of the path.

Gmaps. Gmaps specify physical access structures as materialized PSJ views over logical schema and dependencies. Tsatlos et al., 1994, give a sound, but not complete, algorithm for rewriting PSJ queries against the logical schema in terms of materialized gmaps. However, the methods of the present invention subsume gmaps. In contrast to the query plans obtained by the rewriting process of the present invention, the output of the GMAP rewriting is a family of plans represented by a PSJ query. PSJ queries alone (in the absence of dictionaries) only approximate index structures with their graph relations (binary relations associating keys to values, which are called input, respectively output nodes in gmap terminology). By comparison, the present invention captures the intended meaning of a general gmap definition using dictionaries, for example:

dict $\vec{z}$ in (select $O_1(\vec{x})$ from $\vec{P}\ \vec{x}$ where $B(\vec{x}))\rightarrow$
  select $O_2(\vec{x},\vec{z})$ from $\vec{P}\ \vec{x}$ where $B(\vec{x})$ $O_1, O_2$ have flat record type (as outputs of PSJ queries in the original definition). Notice the correlation between the domain and range of the dictionary. They are given by queries which differ only in the projection of the select clause, a limitation resulting from the gmap definition language. Gmaps can be generalized by overcoming this limitation and supplying different queries for the domain and range of the dictionaries. Similarly to the case of secondary indexes, this generalized form of gmaps with dependencies can be modeled.

In the PSJ modeling of ginaps, queries rewritten in terms of gmaps perform relational joins and don't explicitly express index lookups. Just by looking at the rewritten query, the optimizer cannot decide whether a join should be implemented as such, or in an index-based fashion. In other words, PSJ queries used in the gmap approach are not as close to query plans as queries in the language of the present invention.

The Optimization Model

The optimization algorithm starts with a query Q against a logical schema $\Lambda$ and produces a query plan Q' against the physical schema $\Phi$. Q' will be equivalent to Q under all the constraints, and it will be selected according to a cost model. In addition to optimization for physical data independence, the algorithm performs semantic optimizations allowed by the constraints of the logical schema and eliminates superfluous computations (as in tableau minimization (Abiteboul et al., *Foundations of Databases*, Addison-Wesley, 1995)).

The algorithm has two main phases: the first one, called the "chase," introduces all physical structures in the implementation that are relevant for Q and rewrites Q to a "universal plan" U that explicitly uses them. The second phase, called the "backchase" searches for a minimal plan for Q among the "sub-queries" of U. Combined, they form a novel approach, inspired by the use of constraints as rewrite rules, and motivated by the completeness result, which will be described below.

The model will be described in detail in two parts (phases)—the chase, and the backchase. Initially, D will be used to denote the dependencies on the logical schema, and D' the dependencies between the logical and physical schemas that model the implementation mapping.

Phase 1: chase. Give a constraint of the form $\forall(r_1 \in R_1) \ldots (r_m \in R_m)$
$[B_1 \rightarrow \exists(s_1 \in S_1) \ldots \exists(s_n \in S_n)B_2]$ the corresponding chase step (in a simplified form) is the rewrite select $O(\vec{r})$
from $\ldots, R_1 r_1 \ldots R_m r_m, \ldots$
where $\ldots$ and $B_1$ and $\ldots$
$\downarrow$
select $O(\vec{r})$
from $\ldots, R_1 r_1 \ldots R_m r_m, S_1 s_1, \ldots, S_n s_n, \ldots$
where $\ldots$ and $B_1$ and $B_2$ and $\ldots$ For example, returning to the Proj-Dept schema, the logical query Q chases in one step using $\delta_{JI}$ to the following (wherein it can be seen that new loops and conditions are being added to the ones already existing in Q):

select struct(PN: s, PB: p.Budg, DN: d.DName)
from depts d, d.DProjs s, Proj p, JI j
where s=p.PName and p.CustName="CitiBank"
and j.DOID=d and j.PN=p.Pname The chase phase consists of applying repeatedly chase steps with respect to any applicable constraint from the logical schema and from the characterization of the physical structures, i.e., D U D'. "Applicable" must be defined carefully to avoid trivial loops and to allow for chasing even when the query and the constraint do not match syntactically as easily as shown in the simplified form above. Re-writing can be stopped at anytime, and it will still be sound (under the constraints) for a large class of queries, views, indexes and constraints. As show by Popa and Tannen, 1999, the classical relational chase (Beeri et al., 1984) is, indeed, a particular case of this. While the chase does not always terminate, it does so for certain classes of constraints and queries, yielding an essentially unique result U whose size is polynominal in that of Q. This bound could also be used as a heuristic for stopping the chase when termination is not guaranteed. Sometimes U is denoted by chase(Q).

When the chase phase is applied to the ongoing example, by chasing with $\delta_{JI}$, then with $\delta_{Dept}$, INV1, SI1 and PI1, U is obtainable as follows. None of the other dependencies are applicable.

select struct(PN: s,PB: p.Budg,DN: Dept[d].DName)
from depts d, d.DProjs s, Proj p, JI j
  dom Dept d', Dept[.d'].DProjs s',
  dom SI k, SI[k] t, domI i
where s=p.PName and p.CustName="CitiBank"
  and j.DOID=d and j.PName
  and d=d'and s=s' and p=t
  and p.CustName=k and i=p.PName
  and p=I[i] and d.DName=p.Pdept For the optimization algorithm, the role of the chase phase is to bring, in a systematic way, all the relevant physical structures into the logical query. For example, chasing with (PI1) and (SI1) adds to the query the accessing of the corresponding primary and secondary index. The result of the chase, U, is the universal plan that holds in one place essentially all possible physical plans expressible in the language of the present invention. However, U still references elements of the logical schema, and the role of the next phase is to uncover the physical plans.

Phase 2: backchase. The backchase step is the rewrite:

select $O(\vec{x},y)$
from $R_1 x_1, \ldots, R_m r_m, Ry$
where $O(\vec{x},y)$
$\downarrow$
select $O'(\vec{x},y)$
from $R_1 x_1, \ldots, R_m r_m$
where $C'(\vec{x})$ provided that: (1) the conditions C are implied by C, (2) the equality of O and O' is implied by C, and (3) the following constraint is implied by D U D':

$(\delta)\forall(x_1 \in R_1) \ldots \forall(x_m \in R_m)$
$[C'(\vec{x}) \rightarrow \exists(y \in R)C(\vec{x},y)]$ Thus, the purpose of a backchase step is to eliminate, if possible, a "binding" R y from the from clause of the query. In the case when there are bindings $R_1$, $x_1$ depending on the variable y, the rule must be modified so that either these dependent bindings are eliminated together with R y, as above, such that conditions (1) and (2) are satisfied, in which case Q' is a "subquery" of Q. For computing O' and C, the present invention provides a procedure defined for a large class of queries that is sound when it succeeds, and that always succeeds for the queries for which the algorithm is complete. The idea was to build a database instance out of the syntax of Q, grouping terms in congruence classes according to the equalities that appear in C. Then, C is taken as a maximal set of equalities implied by C (maximality is needed for completeness). This can be checked by looking at the canonical database, as to whether O can be replaced with an equivalent (i.e., in the same congruence class) O' that doesn't depend on y.

If the setting is reduced to that of conjunctive relational tableaux, the notion of subquery coincides with the notion of sub-tableau. The only difference is that in the language of the present invention variables range over tuples, rather than over individuals, and the equalities (implicit in tableaux) are explicit.

While the first two conditions ensure that the backchase reduces a query to a subquery of it, condition (3) guarantees that it reduces it to an equivalent subquery. This is true because its reverse is just the chase step with constraint ($\delta$) followed by a simplification given by (1) and a replacement of equals given by (2). Sometimes the backchase can apply just by virtue of constraints ($\delta$) followed by a simplification given by (1) and a replacement of equals given by (2). Sometimes the backchase can apply just by virtue of constraints ($\delta$) that hold in all instances (so-called trivial constraints). Relational tableau minimization (Abiteboul et al., 1995) is precisely such a backchase. To illustrate, if R(A, B) is a relation then query:

select struct(A: p.A, B: r.B)
   from R p, R q, R r
   where p.B=q.A and q.B=r.B rewrites, by backchase, to select struct(A: p.A, B: q.B)
   from R p, R q,
   where p.B=q.A It is obvious to see that conditions (1) and (2) are satisfied, while condition (3) is true because the following constraint is trivial:

($\delta$)$\forall$(p $\in$ R)$\forall$(q $\in$ R)[p.B=q.A$\rightarrow$
     $\exists$(r $\in$ R)p.B=q.A and q.B=r.B]

Minimal queries. In the algorithms and methods of the present invention, a subquery $Q_1$ of $Q_2$ is called a strict subquery, if $Q_1$ has strictly fewer bindings than $Q_2$. On the other hand, a query Q is minimal if there does not exist a strict subquery Q' of Q, such that Q' is equivalent to Q. In other words, no binding can be removed from Q without losing equivalence. (In fact, this is a generalization of the minimality notion of Levy et al., 1995). In general, the backchase could be considered as minimization for a larger (than just relational tableaux) class of queries, and under constraints. Trying to see whether ($\delta$) of condition (3) is implied by the existing constraints can actually be done with the chase presented above, when constraints are viewed as boolean-valued queries (Popa and Tannen, 1999). Again, this is a decidable problem in the case for which the algorithm is complete.

The backchase phase consists of applying backchase steps until this is no longer possible. Clearly this phase always terminates, and the original query must be among those it could produce, but the obvious strategy for the optimizer is to attempt to remove whatever is in the logical schema, but not in the physical schema. For the case in which the algorithm is complete, any query that results from the backchase phase is minimal (as defined above), and, any minimal subquery of a given query Q is guaranteed to be produced by a backchase sequence from Q.

These can now be assembled, and conventional optimization techniques added, such as "algebraic" rewriting (e.g., pushing selections towards the sources) and cost-based dynamic programming for join reordering (see, Selinger et al., 1988). By ignoring nesting, it is possible to apply these techniques to the queries considered in the present invention. The optimization algorithm follows:

Algorithm 1 (Optimization)
  Input: Logical schema $\Lambda$ with constraints $D_1$
    Constraints D' characterizing physical schema
    Cost function C,
    Query Q($\Lambda$)
  Output: Cheapest plan Q'($\Phi$) equivalent to Q
    Under D U D'
1. for each U($\Lambda$, $\Phi$) chase$_{D,D'}$(Q)
2. for each p($\Phi$) backchase$_{D,D'}$(U)
3. do cost-based conventional optimization, keep cheapest plan so far $p_m$
4. Q'$\leftarrow$$p_m$ The first for loop (chase) enumerates all possible results of chasing (there may be more than one in general). For each such a result, the second for loop (backchase) enumerates all possible backchase sequences (again there may be more than one result), each producing a plan p. In step (3) conventional optimization techniques, including mapping into physical operators different than those that are index-based, are applied top. If the cost of p is smaller than the current minimum cost plan $p_m$, the update $p_m$ to be p. In step (4) the best query plan $p_m$ is the final result.

This can be checked by backchasing the universal plan U, shown previously that $P_0$, $P_1$, $P_2$, and $P_3$ are obtained as minimal queries in this algorithm. Steps (3) and (4) choose the cheapest plan among them.

Rule-based implementation. In an implementation, the conceptual search of algorithm 1 can be specified implicitly by configuring a rule-based optimizer (Cherniack et al., 1996; Graefe et al., In *Query Processing for Advanced Database Systems*, chap. 11, pg 305–335, Morgan Kaufmann, San Mateo, Calif., 1994) with the two rewrite rules chase and backchase, and requesting that the application of the chase rule always takes precedence over that of the backchase rule. Depending on the search strategy implemented by the optimizer, the search space may not be explored exhaustively, but rather pruned using heuristics such as in Iannidis et al., In *Proceedings of ACM-SIGMOD Int'l Conf on Management of Data*, pg 9–22. San Francisco (1987); Steinrunn et al., *VLDB Journal* 6(3):191–208 (1997)).

There is, however, a fundamental difference between the present optimization framework and a rule-based optimizer as in Volcano (Graefe et al., 1994). While in Volcano's optimizer, algebraic and physical transformations are mixed and the search is guided by a cost model, steps (1) and (2) of algorithm 1 are cost-independent, and performed before the phase of (cost-driven) mapping into physical operator trees (other than index-based plans). This is more the spirit of the Starburst optimizer (Lohman et al., *Comm. of the ACM* 34(10):94–109 (1991)), which also had a clear separation between the two kinds of transformations. However, the query rewriting phase in Starburst did not include indexes nor logical constraints, and was heuristics-based.
Optimization Model Improves Previous Approaches to Relational Optimization.

The optimization model of the present invention not only extends beyond the relational model, it also proposes improvements over previous approaches to relational optimization. An important contribution of this work is the systematic procedure for considering all alternative plans enabled by indexes, as opposed to the ad-hoc heuristics proposed previously. Consider, for example, a logical schema with one relation R(A,B,C) and a physical schema containing secondary indexes SA and SB on attributes A and B of R. The present algorithm will discover for the logical query select r.C
   from R r
   where r.A>5 and r.B=20 the following index only access path plan (Ramakrishnan, *Database Management System*. McGraw-Hill, 1998):

select r.C
   from dom SA x, SA [x]$r_1$, SB [20]$r_2$
   where x>5 and $r_1$=$r_2$ Notably, the scan of R is replaced by a scan of index SA (which can be filtered using condition x>5) interleaved with non-failing lookups in index SB.

The algorithm of the present invention exhaustively considers combinations of materialized views, indexes, and semantic constraints, thus generating plans which are not captured in frameworks, such as that of Levy et al., 1995. This assumes a logical schema with relations R(A,B) and S(B,C), and aphysical schema that also has R and S (direct mapping), as well as materialized view V=$\Pi_A$ (R><S) and secondary indexes $I_R$ and $I_S$ on attributes A and B of R and S, respectively. It is a goal of the present invention to optimize the logical query Q=R><S.

Q itself is a valid plan (modulo join-reordering and various implementations for the join). However, the view V can be used to produce the following equivalent query (again ignoring the join order):

(P) select struct(A: r.A, B: s.B, C: s.C)
 from V v, R r, S s
 where v.A=r.A and r.B=s.B This is obtained as a first step of the chase phase, by rewriting Q with one of the two constraints characterizing V (namely $\delta_V$). The techniques used by Levy et al., 1995 for answering/optimizing queries using views can also be used to produce query P in a first phase, similar to the chase. If V is small, P can be implemented, in a typical relational system, much better than Q because of the two indexes. (V is the only relation that is scanned while the relations R and S are accessed via indexes.) However, in the approach of Levy et al., 1995, P is thrown away because Q is a subquery of P; thus, P is not minimal. Minimality, in Levy's case as well as in the present case, is essential for bounding the search space for optimal plans. The problem in the Levy case is that Q and P are the only expressible plans using the conjunctive relational language, and there is no way to express and taking advantage of the indexes at the language level. The language used for gmaps (Tsatlos et al., 1994) suffers from the same limitation.

However, the present invention overcomes this problem and provides a plan that corresponds to good physical implementation. P is still not a minimal plan, thus it will also be thrown away in the backchase phase. But the chase phase doesn't stop with P. The two indexes can be introduced by chasing with constraints relating R and S with $I_R$ and $I_S$, respectively.

(U) select struct(A: r.A, B: s.B, C: s.C)
 from V v, R r, S s, (dom $I_R$)k, $I_R$[k]r',
  (dom $I_S$)p, $I_S$[p]s'
 where v.A=r.A and r.B=s.B and k=r.A
 and r'=r and p=s.B and s'=s Backchasing twice with the "inverse" constraints relating $I_R$ and $I_S$ with, respectively, R and S:

select struct(A: r'.A, B: s'.B, C: s'.C)
 from V v, (dom $I_R$)k, $I_R$[k]r',
  (dom $I_S$)p, $I_S$[p]s'
 where k=v.A and p=r'.B Using the equality k=v.A and the inclusion constraint V[A]⊂R[A] that is inferred in the system of the present invention as a consequence of $\delta_V$, one final step can be backchased and eliminate the loop over dom $I_R$:

select struct(A: r'.A, B: s'.B, C: s'.C)
 from V v, $I_R$[v.A]r', (dom $I_S$)p, $I_S$[p]s'
 where p=r'.B The last transformation replaces a value-based join with a navigation join and the resulting query reflects, almost entirely, the navigation join implementation hinted earlier, except for the loop over dom $I_s$. This loop together with the condition p=r'.B is only a guard that ensures that the lookup of r'.B into $I_S$ doesn't fail. It is not redundant, for without it, equivalence would be lost (recalling that the original query Q never fails). However, using the non-failing lookup, the last query is equivalent to the plan:

select struct(A: r'.A, B: s.B, C: s'.C)
 from V v, $I_R$[v.A]r', $I_S$[r'.B]s'

Completeness

The completeness of algorithm 1 follows immediately from the main theoretical results of the present invention: the bounding chase theorem and the completeness of backchase theorem. The language in which it is written is the "path-conjunctive" (PC) language (mainly the one introduced by Popa and Tannen, 1999).

These results hold for PC queries when the logical schema has arbitrary classes and (nested) relations, but no constraints, while the physical schema has materialized PC views, but no arbitrary indexes (only dictionaries implementing classes). The two results are a generalization to a richer model of the results of Levy et al., 1995.

Path-conjunctive fragment. The path-conjunctive fragment of the ODL/OQL language that has been used is defined below. It includes the relational conjunctive queries of (Aho et al, 1979; Chandra and Merlin, 1977), but is more general because it includes dictionaries and nested relations.

Paths: P::=x|c|R|P.A|dom P|P[x]→
Path-Conjunctions: B::=$P_1$=$P'_1$ and . . . and $P_k$=$P'_k$
PC Queries: select struct($A_1$: $P'_1$, . . . , $A_n$: $P'_n$)
 from $P_1$ $x_1$ . . . , $P_m$ $x_m$
 where B Here, x stands for variables, c denotes constants at base types, and R stands for schema names (relation or dictionary names). The following restrictions are imposed on a PC query Q.

(1) Keys of dictionaries, equalities in the where clause, and the expression in the select clause are not allowed to be/contain expressions of set/dictionary type.

(2) A lookup operation can only be of the form P[x] with the additional condition that there must exist a binding of the form dom P x in the from clause (or, more generally,a binding dom P y, such that the equality x=y is implied by the conditions in the where clause.

This is a PITME checkable condition (Popa and Tannen, 1999). The reason for not allowing an arbitrary lookup is mainly technical. If this were done, all definitions, including query equivalence, would need to be extended with explicit null values, and tedious reasoning about partiality. With this restriction, a lookup operation never fails.

The second of the preceding Restrictions implies that navigation-style joins (involving chains of lookup operations) cannot be expressed in the PC fragment. However, such joins can be rewritten as value-based joins, and vice-versa, provided that certain integrity constraints hold. In the value-based counterpart of a navigation join, a chain of lookups is replaced by explicit joins involving equality of oids. Value-based joins are guaranteed not to touch any dangling oids, and therefore, it is easier to reason with them.

Path-conjunctive constraints. "Embedded path-conjunctive dependencies" (EPCDs), as defined by Popa and Tannen, 1999, are a generalization for the complex value and dictionary model of the relational tgds and egds. (Aho et al., *ACM Transactions on Database Systems*, 4(3):297–314 (1979); Beeri et al, 1984). EPCDs play a fundamental role in rewriting of PC queries by chase and they have the logical form:

EPCD: $\forall(x_1 \in P_1) \ldots \forall(x_n \in P_n)[B_1(\vec{x}) \to$
$(y_1 \in P'_1) \ldots \exists(y_k \in P'_k)B_2(\vec{x}\,\vec{y})]$ $P_i$ and $P'_i$ are paths, while $B_1$ and $B_2$ are path-conjunctions (as defined below, with the same restrictions). Each $P_i$ may refer to variables $x_1, \ldots, x_{i-1}$, while $P'_j$ may refer to $x_1, \ldots x_n, y_1, \ldots y_{j-1}$. Thus, an EPCD is not a first-order formula. A special class of EPCDs are constraints in which there are no existential quantifiers, EGDs. Functional dependencies, like (KEY1) and (KEY2), and the constraints typically involved in conditions (1) and (2) of the backchase step are examples of EGDs.

Main theorems. It is assumed for the remainder of this section, that the logical schema contains only relations and classes (no dependencies), and the physical schema contains only (nested) relations (including materialized PC views) and dictionaries implementing class extents (no dictionaries implementing indexes). These restrictions are needed for the completeness result of theorem 1 below. The result appears to hold, even in the presence of indexes and a certain class of "full dependencies" (introduced by Popa and Tannen, 1999).

Completeness follows from the finiteness of the space of minimal plans. Two upper bounds are provided for this search space. Deutsch et al., 1999 teach how to generalize to PC queries, the upper bound result obtained in Levy et al., 1995 for conjunctive relational queries. Thus, a procedure is justified which enumerates equivalent plans bottom-up by building subsets of, at most, as many views, relations and classes as the number of bindings in the from clause of logical query Q, combining them by setting appropriate conditions in the where clause, then checking equivalence with Q.

In view of a rule-based implementation, however, it turns out that a top-down enumeration procedure, implemented as step-by-step rewriting, is better suited, and the algorithm of the present invention uses a different, novel characterization of the search space of query plans:

Theorem 1 (Bounding Chase). Any minimal plan $Q'(\Phi)$ for logical query $Q(\Lambda)$ is a subquery of the universal plan chase $(Q)(\Lambda,\Phi)$.

In this case, chase (Q) means the result of chasing Q with the set of all dependencies of the form $\delta_V$ associated with the view definitions. Since these are fall dependencies (as defined by Popa and Tannen, 1999), chase (Q) exists and is unique.

Theorem 1 allows the enumeration of all minimal plans of Q by enumerating those subqueries of chase (Q) which mention only the physical schema $\Phi$. Conceptually, the enumeration proceeds by first listing the largest subqueries of chase (Q), which involve only the physical schema $\Phi$, pruning away those subqueries which are not equivalent to chase (Q) and then applying itself recursively to each non-pruned subquery. The equivalence check can be done by unfolding the view definitions. It follows easily from the definition of subqueries that the pruning step does not compromise completeness. This is because whenever a subquery of chase (Q) is not equivalent to the latter, neither are its subqueries.

The following theorem states that the desired enumeration and pruning of equivalent subqueries can be implemented in a rule-based optimizer by rewriting with the backchase rule:

Theorem 2 (Complete Backchase). The minimal equivalent subqueries of a query Q $(\Lambda,\Phi)$ are exactly the normal forms of backchasing $Q(\Lambda,\Phi)$.

The use of the chase as an upper bound for the space of minimal plans leads to an enumeration procedure that remains sound even in the presence of constraints on the logical schema and of indexes, which are not dealt with by Levy et al., 1995.

Corollary 3 (Completeness of algorithm 1). If $\Lambda$ contains no dependencies and $\Phi$ contains no indexes, algorithm 1 is complete for PC queries.

The algorithm of the present invention takes exponential time. In other words, each chase step is exponential, but in the case of chasing with $\vec{d}v$, and more generally, as shown in Popa and Tannen, 1999, when chasing with arbitrary full dependencies, the chase rule applies only polynomially many times, resulting in a query whose size is polynomial in the size of the chased query. The second phase of algorithm 1 preserves the exponential complexity: Each backchase step is exponential (it uses the chase to check the applicability of the rule), but it eliminates a binding. Consequently, the backchase process always reaches a normal form after, at most, as many steps as there are bindings in the result of the chase.

Part II. Implementation of the C&B Technique

Based upon the prototype implementation of the C&B technique for path-conjunctive queries and constraints, three experimental configurations are used to demonstrate how the present invention meets the stated objects set forth above. The experiments repeat on families of queries and schemas of similar structure, but of increasingly complexity. This permits measurements to demonstrate how far the technique can operate, and shows that the applicability range of the implementation includes many practical queries. For one of the configurations where a conventional execution engine can be used, the global benefit of the C&B technique is determined by measuring the reduction in total processing (optimization+execution) time, as a function of the complexity of the queries and the schema.

Motivating Issues Demonstrating a Need for Optimization.

To illustrate the need for optimization, two motivating examples follow to present certain optimizations that represent what one would like to see performed automatically in a database system.

Scenario 1.

This scenario presents a very simple and common relational scenario adapted from Baker, *DB2 Magazine* 4(2):54–55 (Summer 1999), showing the benefits of exploiting referential integrity constraints. Consider a relation R(A,B,C,E) and a query that selects all tuples in R with given values for attributes B and C:

(Q) select struct (A=r.A, E=r.E) from R r
    where r.B=b and r.C=c

The relation is very large, but the number of tuples that meet the where clause criteria is very small. However, the SQL engine is taking a long time in returning an answer, leading to the question: Why isn't the system using an index on R? The answer is that it is not doing so simply because there is no index on the attributes B and C. The only index on R that includes B and C, is an index on ABC. There is no index with B and/or C in the high-order position(s), and the SQL optimizer chooses to do a table scan of R.

The only way of forcing the SQL optimizer to use the index on ABC, is to rewrite Q into an equivalent query that does a join of R with a small table S on attribute A knowing that there is a foreign key constraint from R into S on A:

$(Q^1)$ select struct (A=r.A, E=r.E) from R r, S s
    where r.B=b and r.C=c and r.A=s.A Although no attributes from S have been selected, the join with S is of a great benefit. The SQL optimizer chooses to use S as the outer table in the join and while scanning S, as each value a for A is retrieved, the index is used to lookup the tuples corresponding to a, b, c.

Scenario 2.

Integrity constraints also create opportunities for rewriting queries using materialized views. Consider the query Q given below, which joins relations $R_1(K, A_1, A_2, F, \ldots)$, $R_2(K, A_1, A_2, \ldots)$ with $S_{ij}(A_1, B, \ldots)(1 \leq i \leq 2, 1 \leq j \leq 2)$. FIG. 1 depicts the join graph of Q, in which the nodes represent the query variables, and the edges represent equijoins between them.

One can think of $R_1$, $S_{11}$ and $S_{12}$ as storing together one large conceptual relation U, that has been normalized for storage efficiency. Thus, the attributes $A_1$ and $A_2$ of $R_1$ are foreign keys into $S_{11}$ and, respectively, $S_{12}$. The attributes K of $R_1$ is the key of $U_1$ and, therefore, of $R_1$. Similarly, $R_2$, $S_{21}$ and $S_{22}$ are the result of normalizing another large conceptual relation, $U_2$. For simplicity, the same name is used for attributes $A_1$; $A_2$, and K of $U_1$ and $U_2$, but in reality, they can each store different kinds of information. In addition, the conceptual relation $U_1$ has foreign key attributes F into $U_2$, and this attribute is stored in $R_1$. The foreign key join of $U_1$ and $U_2$ is performed, which translates to a complex join across the entire database. The query returns the values of the attributes B from each of the "corner" relations $S_{11}$, $S_{12}$, $S_{21}$, $S_{22}$ (again for simplicity, the same name B is used, but in reality each relation may store different kinds of information).

(Q) select struct ($B_{11}$: $s_{11}$.B, $B_{12}$: $s_{12}$.B,
    $B_{21}$: $S_{21}$. B, $B_{22}$: $S_{22}$ B)
  from $R_1$ $r_1$, $S_{11}$ $s_{11}$, $S_{12}$ $S_{12}$,
    $R_2$ $r_2$, $S_{21}$ $S_{21}$, $S_{22}$ $S_{22}$
  where $r_1.F=r_2.K$ and
    $r_1.A_1=s_{11}.A_1$ and $r_1.A_2=s_{12}.A_2$ and
    $r_2.A_1=s_{21}.A_1$ and $r_2.A_2=s_{22.A2}$ Suppose now that the attributes B of the "corner" relations have few distinct values. Therefore, the size of the result is relatively small compared to the size of the database. Nevertheless, in the absence of any indexes on the attributes B of the "corner" relations, the execution time of the query is very long. In the present invention, instead of indexes, the existence of materialized views $V_i(K, B_1, B_2)(1 \leq i \leq 2)$ are assumed, in which each $V_i$ joins $R_i$ with $S_{i1}$ and $S_{i2}$, and retrieves the B attributes from $S_{i1}$ and $S_{i2}$ together with the key, K, of $R_i$:

($V_i$) select struct (K: r.K, $B_1$ : $s_1$, $B_2$: $s_2$.B)
  from $R_i$ r, $S_{i1}$ $s_1$, $S_{i2}$, $S_2$
  where $r.A_1=s_1.A_1$ and $r.A_2=s_2.A_2$ It is easy to see that the join of $R_2$, $S_{21}$, and $S_{22}$ can now be replaced by a scan over $V_2$:

(Q') select struct ($B_{11}$: $s_{11}$.B, $B_{12}$: $s_{12}$.B)
    $B_{21}$: $v_2.B_1$, $B_{22}$: $v_2.B_2$)
  from $R_1$ $r_1$, $S_{11}$ $s_{11}$, $S_{12}$ $S_{12}$, $V_2$ $v_2$)
  where $r_1.F=v_2.K$ and
    $r_1.A_1=s_{11}.A_1$ and $r_1.A_2=s_{12}.A_2$ However, the join of $R_1$, $S_{11}$, and $S_{12}$ cannot be replaced by a scan over $V_1$. Q", which is the obvious candidate for rewriting Q using both $V_1$ and $V_2$ is not equivalent to Q in the absence of additional semantic information.

(Q") select struct ($B_{11}$: $v_1.B_1$, $B_{12}$: $v_1.B_2$,
    $B_{21}$: $v_2.B_1$, $B_{22}$: $v_2.B_2$)
  from $R_1$ $r_1$, $V_1$ $v_1$, $V_2$ $v_2$
  where $r_1.K=v_1.K$ and $R_1.F=v_{12}.K$ The reason is that VI does not contain the F attribute of $R_1$, and there is no guarantee that joining the latter with $V_1$ will recover the correct values of F. On the other hand, if it is known know that K is a key in $R_1$ then Q" is guaranteed to be equivalent to Q, being, therefore, an additional (and likely better) plan.

As will be shown, the C&B technique of the present invention covers and amply generalizes both of the motivating examples set forth above.

The Practical Solution: Implementation Techniques
1. Feasibility of the Chase.

The chase must be feasible. In fact, feasibility of the chase is critical because the chase is heavily used, both to build the universal plan, and in order to check the validity of a constraint used in a backchase step. In evaluating the technique of the present invention, for each experimental configuration, the time to obtain the universal plan is determined as a function of the size of the query and the number of constraints. Significantly, the results prove that the cost of the (efficiently implemented) chase is negligible.

Each chase step includes searching for homomorphisms mapping a constraint into the query. A "homomorphism" from a constraint $c = \forall(\vec{u} \in \vec{U})B_1(\vec{u}) \rightarrow \exists(\vec{e} \in \vec{E})B_2(\vec{u}, \vec{e})$ into a query Q is a mapping from the universally qualified variables of c into the variables of Q such that, when extended in the natural way to paths, it obeys the following conditions:

1) any universal quantification $u \in U$ of c corresponds to a binding P h(u) of Q such that either h(U) and P are the same expression or h(U)=P follows from the where clause of Q.
2) for every equality $P_1=P_2$ that occurs in $B_1$ either $h(P_1)$ and $h(P_2)$ are the same expressions, or $h(P_1)=h(P_2)$ follows from the where clause of Q.

Finding a homomorphism is NP-complete, but only in the size of the constraint (always small in practice). However, the basis of the exponent is the size of the query being chased which can become large during the chase. Since the language of the present invention is more complicated than a relational one, because of dictionaries and set nesting, homomorphisms are more complicated than just simple mapping between goals of conjunctive queries, and checking that a mapping from a constraint into a query is indeed a homomorphism is not straightforward. By using dictionaries (finite functions) in physical schemas, useful access structures such as indexes, materialized views, source capabilities, access support relations, gmaps, etc., can be captured with constraints.

The following are some techniques that may be used to avoid unnecessary checks for homomorphisms, and to speed up the chase:

Use of congruence closure (a variation of Nelson et al, *FOCS*, pages 114–119 (1977) for fast checking if an equality is a consequence of the where clause of the query.

Pruning variable mapping that cannot become homomorphisms by reasoning early about equality. Instead of building the entire mapping and checking in one big step whether it is a homomorphism, this is done incrementally. For example, if h is a mapping that is defined on x and y, and x.A=y.A occurs in the constraint, then it should be verified whether h(x).A=h(y).A is implied by the where clause of the query. This works well in practice because typically the "good" homomorphisms number only a few among all possible mappings.

Implementation of the chase as an inflationary procedure that evaluates the input constraints on the internal representation of the input query. The evaluation looks for homomorphisms from the universal part of constraints into the query, and "adds" to the internal query representation (if not there already) the result of each homomorphism applied to the existential part of the constraint. (This is translated as a check for trivial equivalence.) The analogy with query evaluation on a small database is another explanation of why the chase is fast.

The experimental results about the chase shown below are very positive, and show that even chasing queries consisting of more that 15 joins with more that 15 constraints is quite practical.

2. Feasibility of the Backchase.

A "full implementation of the backchase" (FB) consists of backchasing with all available constraints starting from the universal plan obtained by chasing also with all constraints. This implementation exposes the bottleneck of the approach, i.e., the exponential (in the size of the universal plan) number of subqueries explored in the back chase phase. A general analysis suggests using "stratification" heuristics, i.e., dividing the constraints into smaller groups and chasing/backchasing with each group successively.

Two approaches to this are examined below: (1) fragmenting the query and stratifying the constraints by relevance to each fragment (On-line Query Fragmentation (OQF)); and (2) splitting the constraints independently of the query (Off-line Constraint Stratification (OCS)). In the important case of materialized views, OQF can be used without losing any plan that might have been found by the full implementation (theorem 3). To evaluate and compare FB, OSC and OQF strategies the following are measured: (1) the number of plans generated, (2) the time spent per generated plan, and (3) the effect of fragment granularity.

The following analysis of a simple, but important case (Oust indexes), shows that a full implementation of the backchase can unnecessarily explore many subqueries.

Assume a chain query that joins n relations $R_1(A, B), \ldots, R_n(A,B)$:

(Q) select struct(A=$r_1$.A, B=$r_n$.B)
    from $R_1$ $r_1$, . . . , $R_n$ $r_n$
    where $r_1$.B=$r_2$.A and . . . and $r_{n-1}$.B=$r_n$.A and suppose that each of the relations has a primary index $I_i$ on A. Let D={$d_1$, $d'_1$, . . . $d_n$, $d'_n$} be all the constraints defining the indexes ($d_i$ and $d'_i$ are the constraints for $I_i$).

In principle, any of the $2^n$ plans obtained by either choosing the index $I_i$ or scanning $R_i$ for each i is plausible. One direct way to obtain all of them is to chase Q with the entire set of constraints D, obtain the universal plan U (of size 2n), and then backchase it with D. The backchase inspects top-down all subqueries of U, from size 2n−1 to size n (any subquery with less than n loops cannot be equivalent to U), for a total of: $C^{2n-1}_{2n}+ \ldots +C^n_{2n}=2^{2n-1}+\frac{1}{2}C^n_{2n}-1$.

The same $2^n$ plans can be obtained with a different strategy, much closer to the one implemented by standard optimizers.

For each i, handle the ith loop of Q independently: chase, then backchase the query fragments $Q_i$ of Q that contain only $R_i$ with {$d_i$, $d'_i$} to obtain two plans for $Q_i$, one using $R_i$, the other using the index $I_i$. At the end, assemble all plans generated for each fragment $Q_i$ in all possible combinations to produce the $2^n$ plans for Q.

The number of plans inspected by this "stratified" approach can be computed as follows.

For each stage i, the universal plan for fragment $Q_i$ has only 2 loops (over $R_i$ and $I_i$), and therefore the number of plans explored by the subsequent backchase is 2. Thus the work to produce all the plans for all fragments is 2n. The total work, including assembling the plans, is then $2n+2^n$. This analysis suggest that detecting classes of constraints that do not "interact", grouping them accordingly, and then stratifying the chase/backchase algorithm, such that only one group is considered at a time, can decrease exponentially the size of the search space explored.

Figure 2:
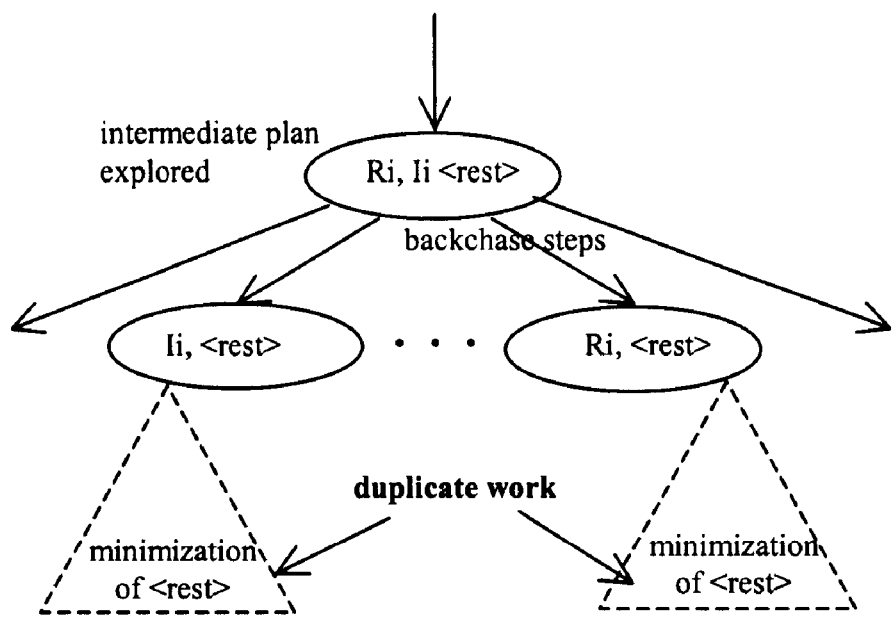
FIG. 2 is a diagram showing the duplication of work during minimization. At some point during the backchase, there will be a backchase step that eliminates $R_j$, and another backchase step that eliminates $I_j$.

The crucial intuition that explains the difference in efficiencies of the two approaches is as follows. In the first strategy, for a given i, the universal plan contains at the beginning of the backchase, both $R_i$ and $I_i$. At some point during the backchase, since a plan containing both is not minimal, there will be a backchase step that eliminates $R_i$, and another backchase step, at the same level, that eliminates $I_i$ (see FIG. 2). The minimization work that follows is exactly the same in both cases, because it operates only on the rest of the relations. This duplication of work is avoided in the second strategy because each loop of Q is handled exactly once. A solution that naturally comes to mind to avoid such situations is to use dynamic programming. Unfortunately, there is no direct way to do this in general. Instead, the following stratification algorithm (On-line Query Fragmentation strategy (OQF)) solves the problem for a restricted, but common, case.

On-line Query Fragmentation (OQF).

Figure 3:
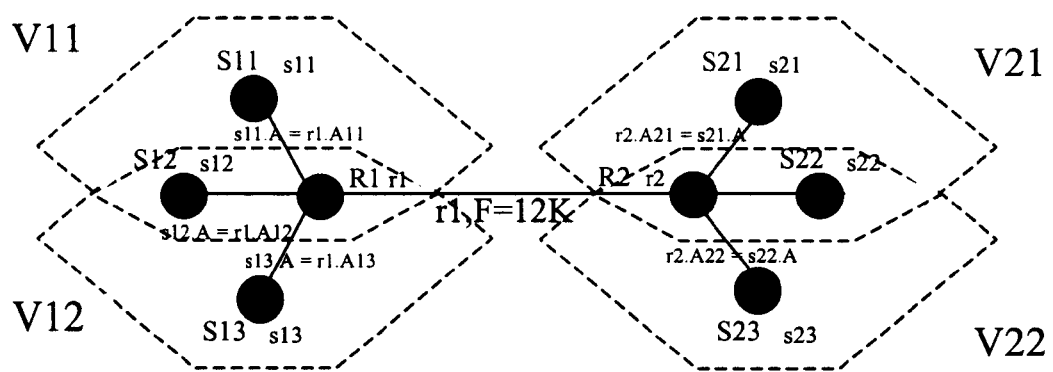
FIG. 3 is a diagram showing the Chain-of-Stars query Q with views, illustrating the On-Line Query Fragmentation strategy.

As shown in FIG. 3, the query graph is shaped liked a chain of 2 stars, star i having $_i$ for its hub and $S_{ij}$ for its corners ($1 \leq i \leq 2$, $1 \leq j \leq 3$). The attributes selected in the output are the B attributes of all corners $S_{ij}$. Assume the existence of materialized views $V_{il}$(K, $B_1$, $B_2$)($1 \leq i \leq 2$, $1 \leq l \leq 2$), where each $V_{il}$ joins the hub of star i ($R_i$) with two of its corners ($S_{il}$ and $S_{i(l+1)}$). Each $V_{il}$ selects the B attributes of the corner relations it joins as well as the K attributes of $R_i$.

If the FB algorithm is applied, with all the constraints describing the views, all possible plans are obtained in which views replace some parts of the original query. However $V_{11}$ or $V_{12}$ can only replace from the first star. If a plan P, using $V_{11}$ and/or $V_{12}$, is obtained for the first star, such that it "recovers" the B attributes needed in the result of Q, as well as the F attributes of $R_1$ needed in the join with $R_2$, then P can be joined back with the rest of the query equivalent to Q. That is to say that $V_{11}$ overlaps with neither $V_{21}$ nor $V_{22}$. On the other hand, this does not apply to $V_{11}$ and $V_{12}$ because the parts of the query that they cover overlap (and any further decomposition will lose the plan that uses both $V_{11}$, and $V_{12}$). Q can thus be decomposed into precisely two query fragments one for each star that can be optimized independently.

However, before giving the full details of the OQG algorithm, the following ideas must be formalized.

"Query Fragments." The "closure Q* of query Q" is defined as a query with the same select and from clauses as Q, while the where clause consists of all the equalities occurring in or implied by the where clause of Q. Q* is computable from Q in PTIME and is equivalent to Q (a congruence closure algorithm for this construction is shown by Popa and Tannen, in *Technical Report MS-CIS-98-34*, University of Pennsylvania (1998)). Given a query Q and a subset S of its from clause bindings, a "query fragment Q' of Q induced by S" is defined as follows: (1) the from clause consists of exactly the bindings in S; (2) the where clause consists of all the conditions in the where clause of Q*, which mention only variables bound in S; (3) the select clause consists of all the paths P over S that occur in the select clause of Q or in an equality P=P' of Q*'s where clause, where P' depends on at least one binding that is not in S. In the latter case, such P is defined as a "link path" of the fragment.

"Skeletons." While in general the chase/backchase algorithm can mix semantic with physical constraints, in the remainder of this section a stratification algorithm is described that can be applied to a particular class of constraints, defined as "skeletons." This class is sufficiently general to cover the usual physical access structures, such as indexes, materialized views, ASRs, gmaps. Each of these can be described by a pair of complementary inclusion constraints. A skeleton is defined as a pair of complementary constraints:

$$d = \forall(\vec{x} \in \vec{R})[B_1(\vec{x}) \rightarrow \exists(\vec{v} \in \vec{V})B_2(\vec{x}, \vec{v})]$$

$$d^- = \forall(\vec{v} \in \vec{V})\exists(\vec{x} \in \vec{R})B_1(\vec{x}) \text{ and } B_2(\vec{x}, \vec{v})$$

such that, all schema names occurring among $\vec{V}$, belong to the physical schema, while all schema names occurring among $\vec{R}$, belong to the logical schema.

Algorithm 2 (Decomposition into Fragments)

Given a query Q and a set of skeletons V:

1. Construct an interaction graph G as follows: 1) there is a node labeled (V, h) for every skeleton V=d, d') in V, and homomorphism h from d to Q; 2) there is an edge between $(V_1, h_1)$ and $(V_2, h_2)$ if the intersection between the bindings of $h(d_1)$ and $h(d_2)$ is non-empty.
2. Compute the connected components $\{C_1, \ldots, C_k\}$ of G.
3. For each $C_m = \{(V_1, h_1), \ldots, (V_2, h_2)\}$ $(1 \leq m \leq k)$ let S be the union of the sets of bindings in $h_i(d_i)$ for all $1 \leq i \leq n$, and compute $F_m$ as the fragment of Q induced by S.
4. The decomposition of Q into fragments consists of $F_1, \ldots, F_k$ together with the fragment $F_{k+1}$ induced by the set of bindings that are not covered by $F_1, \ldots, F_k$.

The resulting fragments are disjoint, and Q can be reconstructed by joining them on the link paths.

Algorithm 3 (The On-line Query Fragmentation strategy (OQF))

Given a query Q and a set V of skeletons:

1. Decompose Q into query fragments $\{F_1, \ldots, F_n\}$ based on V using preceding Algorithm 2.
2. For each fragment $F_i$ find the set of all minimal plans by using the chase/backchase algorithm.
3. A plan for Q is the "Cartesian product" of sets of plans for fragments (cost-based refinement: the best plan for Q is the join of the best plans for each individual fragment).

Theorem 3. For a skeleton schema, OQF produces the same plans as the full backchase (FB) algorithm.

In the limit case when the physical schema contains skeletons involving only one logical schema name (such as primary/secondary indexes), OQF degenerates smoothly into a backchase algorithm that operates individually on each loop of the query to fmd the access method for that loop. One of the purposes of the experimental configuration, EC1, is to demonstrate that OQF performs well in a typical relational setting. However, OQF can be used in more complex situations, such as rewriting queries with materialized views. While in the worst case, when the views are strongly overlapping, the fragmentation algorithm may result in one fragment (the query itself), in practice, reasonably good decompositions in fragments will be acheived. Scalability of OQF in a setting that exhibits a reasonable amount of non-interaction between views is demonstrated by using the experimental configuration, EC2.

Off-line Constraint Stratification.

One disadvantage of OQF is that it needs to find the fragments of a query Q. While this has about the same complexity as chasing Q (noting that the chase also needs to find all homomorphisms between constraints and the query problem), in practice there may be situations in which interaction between constraints can be estimated in a pre-processing phase that examines only the constraints in the schema. The result of this phase is a partitioning of constraints into disjoint sets ("strata") such that only the constraints in one set are used at one time by the algorithm.

As opposed to OQF, this method tries to isolate the independent optimizations that may affect a query by stratifying the constraints without fragmenting the query. During the optimization, the entire query is pipelined through stages in which the chase/backchase algorithm uses only the constraints in one set. At each stage different parts of the query are affected.

The following algorithm computes the stratification of the constraints.

Algorithm 4 (Stratification of Constraints). Given a schema with constraints, do:

1. Construct an "interaction graph" G as follows:
   a) there is a node labeled c for every constraint c.
   b) there is an edge between nodes $c_1$ and $C_2$ if there is a homomorphism (similar to the previously described homomorphism) from the tableau of $c_1$ into that of $c_2$, or viceversa. The tableau T(c) of a constraint $c = \forall(\vec{u} \in \vec{U})B_1(\vec{u}) \rightarrow \forall(\vec{e} \in \vec{E})B_2(\vec{u}, \vec{e})$ is obtained by putting together both universally and existentially quantified variables and by taking the conjunction of all conditions: $T(c) = \forall(\vec{u} \in \vec{U})\forall(\vec{e} \in \vec{E})B_1(\vec{u})^\wedge B_2(\vec{u}, \vec{e})$.
2. Compute the connected components $\{C_1, \ldots, C_k\}$ of G. Each $C_i$ is a stratum.

Using algorithm 4, the following refinement of the C&B strategy is defined, termed the "off-line constraint stratification" (OCS) algorithm (algorithm 5):

Algorithm 5 (OCS). Given a query Q and a set of constraints C:

1. Partition C into disjoint sets of constraints $\{S_i\}_{1 \leq i \leq k}$ by using algorithm 4.
2. Let $P_o = \{Q\}$. For every $1 \leq i \leq k$, let $P_i$ be the union of the sets of queries obtained by chase/backchase each element of $P_{i-1}$ with the constraints in $S_i$.
3. Output $P_k$ as the set of plans.

Algorithm 4 makes the following optimistic assumptions about the non-interaction of constraints: Even though there may not be any homomorphism between the constraints, depending on the query, they might still interact by mapping to overlapping subqueries at run time. Therefore, the OCS strategy is subsumed by the on-line query fragmentation, but it has the advantage of being done before query optimization.

Figure 4:
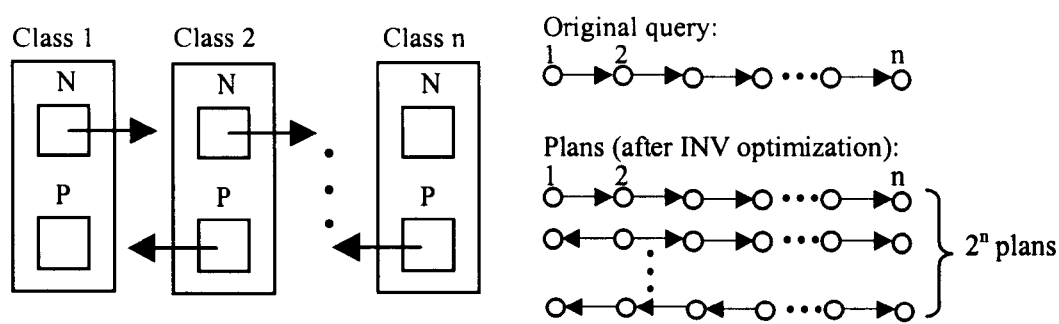
FIG. 4 is a diagram depicting Inverse Relationships.

In FIG. 4, the inverse relationships of at least three classes are shown (Class 1, Class 2, through Class n (n=3)), described by dictionaries $M_1$, $M_2$, $M_3$. Each $M_i$ includes a set-valued attributed N ("next") and a set-valued attribute P ("previous"). For each i=1,2, there exists a many-many inverse relationships between $M_i$ and $M_{i+1}$ that goes from $M_i$ into $M_{i+1}$ into $M_i$ by following the N references, and comes back from $M_{i+1}$ into $M_i$ by following the P references. The inverse relationship is described by two constraints, $INV_{iN}$ and $INV_{iP}$, of which the first is shown below:

$\forall(k \in \text{dom } M_i)\forall(o \in M_i[k].N)$ $\exists(k' \in \text{dom } M_{i+1})\exists(o' \in M_{i+1}[k'].P)k' = o \text{ and } o' = k$ By running algorithm 4, the following stratification of constraints is obtained into two strata: $\{INV_{1N}, INV_{2P}\}$ and $\{INV_{2N}, INV_{2P}\}$. Suppose now that the incoming query Q is a typical navigation, following the N references from class $M_1$ to class $M_2$ and from there to $M_3$:

select struct (F=$k_1$, L=$o_2$)

from dom $M_1$ $k_1$, $M_1[k_1]$.N $o_1$, dom $M_2$ $k_2$, $_{M2}[k_2]$.N $o_2$ where $o_1$=$k_2$ By chase/backchasing Q with the constraints of the first stratum, {$INV_{1N}$, $INV_{1P}$}, in addition to Q, query $Q_1$ is obtained, in which the sense of navigation from $M_1$ to $M_2$ following the N attribute is "flipped" to a navigation in the opposite sense: from $M_2$ to $M_1$ along the P attribute.

(Q1) select struct (F=$o_1$, L=$o_2$)

from dom $M_2$ $k_2$, $M[k_2]$.P $o_1$, $M_2[k_2]$.N $o_2$

In the stage corresponding to stratum 2, {Q, $Q_1$} are chased and backchased with {$INV_{2N}$, $INV_{2P}$}, this time flipping in each query the sense of navigation from $M_2$ to $M_3$ via N to a navigation from $M_3$ to $M_2$ via P. The result of this stage consists of four queries: the original Q and $Q_1$ (obtained by chasing, and then backchasing with the same constraint), plus two additional queries. One of them, obtained from $Q_1$, is shown below:

select struct (F=$o_1$, L=$k_3$)

from dom $M_3$ $k_3$, $M_3[k_3]$.P $o_3$, dom $M_2$ $k_2$ $M_2[k_2]$.P $o_1$ where $o_3$=$k_2$ The OCS strategy does not miss any plans for this example (see also the experimental results for OCS with EC2), but in general, it is just a heuristic. Algorithm 4 makes optimistic assumptions about the non-interaction of constraints, which depending on the input query, may turn out to be false. Therefore, it is not complete, and EC2 is an example of such a case.

The Architecture of the Prototype.

Figure 5:
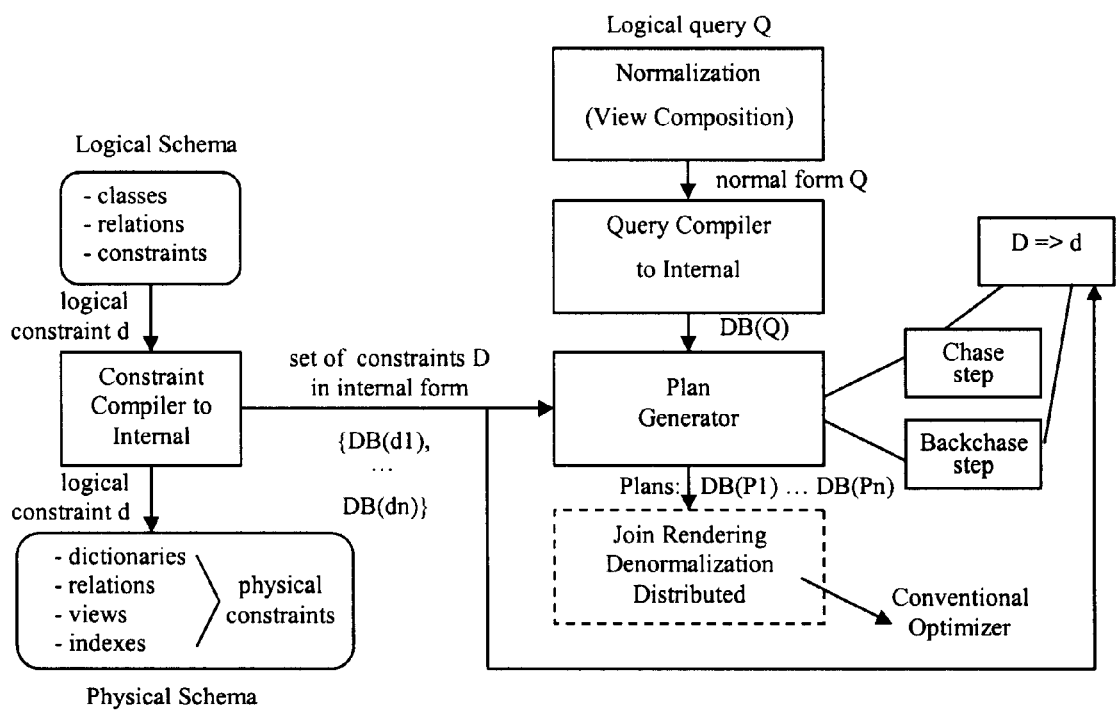
FIG. 5 is a flowchart depicting the architecture of the system that implements the C&B (chase and backchase) technique, representing about 25,000 lines of Java code.

In the present invention, the architecture of the system that implements the C&B technique (about 25,000 lines of Java code) is shown in FIG. 5. The arrowed lines show the main flow of a query being optimized, constraints from the schema, and resulting plans. The thick lines show the interaction between modules. The main module is the "plan generator" which performs the two basic phases of the C&B (chase and backchase). The backchase is implemented top-down by removing one binding at a time and minimizing recursively the subqueries obtained (if they are equivalent). Checking for equivalence is performed by verifying that the dependency equivalent to one of the containments is implied by the input constraints. (The other containment is always true.) The module that does the check, "dependency implication," shown in the figure as D→d, uses the chase. The most salient features of the implementation can be summarized as:

- Queries and constraints are compiled into a (same!) internal congruence closure based canonical database representation (shown in the figure as DB (Q) for a query Q, respectively DB(d) for a constraint d) that allows for fast reasoning about equality.
- Compiling a query Q into the canonical database is implemented itself as a chase step on an empty canonical database with one constraint having no universal, but one existential, part isomorphic to Q's from and where clauses put together. Hence, the query compiler, constraint compiler and the chase modules are basically one module.
- a language for queries and constraints that is in the spirit of OQL.
- a script language that can control the constraints that are fed into the chase/backchase modules. This is how the off-line stratification strategy and various other heuristics are implemented in the present invention.

Dynamic Programming and Cost-based Pruning.

Dynamic programming can only be applied when a problem is decomposable into independent subproblems, where common subproblems are solved only once and the results reused. Unfortunately, the minimization problem lacks common subproblems of big enough granularity: One cannot minimize in general a subpart of a subquery independently of how the subpart interacts with the rest of the query. In general, each subset of the bindings of the original query explored by the backchase must be considered as a different subproblem.

The non-applicability of dynamic programming is in general a problem for rewriting queries using views. What is meant in the prior art (Tsatalos et al., 1996; Chaudhuri et al., 1995) by incorporate optimization with views/ginaps into standard System R-style optimizer, is actually the blending of the usual cost-based dynamic programming algorithm with a brute-force exponential search of all possible covers. The algorithms remain exponential, but cost-based pruning can be done earlier in the process.

The optimizer of the present invention can be easily extended in the same way. On the other hand, OQF already incorporates the principle of dynamic programming in the sense that it identifies query fragments that can be independently minimized.

Top-down vs. Bottom-up.

In the "top-down," full approach, the backchase explores only equivalent subqueries (referred to as "candidates"), and tries to remove one "from" binding at a time until a candidate can no longer be minimized (all of its subqueries are non-equivalent). The main advantage of this approach is that through depth-first search it finds a first plan fast, while the main disadvantage is that the cost of a subquery explored cannot be used for cost-based pruning (ignoring heuristics that need preliminary cost estimates) because a backchase step might further improve the cost.

In the "bottom-up" approach, the backchase explores non-equivalent candidates. It assembles subqueries of the universal plan by considering first candidates of size 1, then of size 2, and so on, until an equivalent candidate is reached. Then, cost-based pruning is possible because a step of the algorithm can only increase the cost. A best-first strategy can be easily implemented by sorting the fragments being explored based on cost. The main disadvantage of this strategy is that it involves breadth-first search, and the time for finding the first plan can be long.

In practice one could combine the two approaches: start top-down, find the first plan, then switch to bottom-up (combined with cost-based pruning), using the cost of the first plan as the cost of the best plan. While the exemplified FB implementation is a top-down approach, it is applicable to both strategies, as well as a combination of the two.

The present invention is further described in the following examples. These examples are not to be construed as limiting the scope of the appended claims.

EXAMPLES

The invention is further described in detail by reference to the following experimental examples. These examples are provided for purposes of illustration only, and are not intended to be limiting unless otherwise specified. Thus, the invention should in no way be construed as being limited to the following example, but rather, should be construed to encompass any and all variations which become evident as a result of the teaching provided herein.

The following examples present experimental configurations representing three different settings that exhibit the mix of physical structures and semantic constraints that are advantageous in the optimization approach of the present invention, and report the results for the chase and the backchase. The scenarios are relevant for many practical situations, and are intended to be merely exemplary to those skilled in the art.

Experimental Configurations.

Experimental Configuration EC1: The first setting is used to demonstrate the use of the present optimizer in a relational setting with indexes. This is a simple, but frequent, practical case, and therefore, it is considered as a baseline.

The schema includes n relations, each relation Ri with a key attribute K, on which there is a primary index $PI_i$, a foreign key attribute N, and additional attributes. The first j of the relations have secondary indexes $SI_i$ on N, thus the total number of indexes in the physical schema is m=n+j. As described above, chain queries, of size n, are considered in which there is a foreign key join (equating attributes N and K) between each $R_i$ and $R_{i+1}$. The scaling parameters for EC1 are n and m.

Experimental Configuration EC2: The second setting is designed to illustrate experimental results in the presence of materialized views and key constraints.

This involves a generalization of the chain of stars query, in which there are i stars with j corner relations, $S_{i1}, \ldots, S_{ij}$, that are joined with the hub of the star $R_i$. The query returns all the B attributes of the corner relations. For each, assume $v \geq j-1$ materialized views $V_{i1}, \ldots, V_{iv}$ each covering, as in the previous examples, three relations. The attribute K of each $R_i$ is assumed to be a primary key. The scaling parameters are i, j and v.

Experimental Configuration EC3: This is an object-oriented configuration with classes obeying many-to-many inverse relationship constraints. It shows how semantic optimization based on the inverse constraints can be mixed to discover plans that use access support relations (ASRs). The query that does not appear to be directly "mappable" into the existing ASRs, and the semantic optimization "component" of C&B enables rewriting the query into equivalent queries that can map into the ASRs.

The scenario is generalized, and considers n classes with inverse relationships. The queries Q (see FIG. 4) that are considered to be long navigation queries across the entire database following the N references from class $M_1$ to class $M_n$. In addition, as part of the physical schema, there are access support relations (ASRs) that are materialized navigation joins across three classes going in the backwards direction (i.e., following two P references). Each ASR is a binary table storing oids from beginning and from the end of the navigation path. Plans obtained after the inverse optimization phase are rewritten in the second phase into plans that replace a navigation chain of size 2 with one navigation chain of size 1 that uses an ASR. The parameter of the configuration is the number of classes n. There are $n-\frac{1}{2}$ non-overlapping ASRs that cover the entire navigation chain.

Experimental Settings.

All the experiments have been realized on a dedicated commodity workstation (Pentium III, Linux RH-6.0, 128 MB of RAM). The optimization algorithm is run using IBM JRE-1.1.8. The database management system used to execute queries is IBM DB2 version 6.1.0 (out-of-the-box configuration). For EC2, materialized views have been produced by creating and populating tables. All times measured are "elapsed times," obtained using the Unix shell time command. In all graphs, whenever values are missing, it means that the time to obtain them was longer than the timeout used (2 mins).

Example 1

Chase Feasibility

The complexity of the chase in all experimental configurations was measured varying both the size of the input query and the number of constraints.

Figure 6:
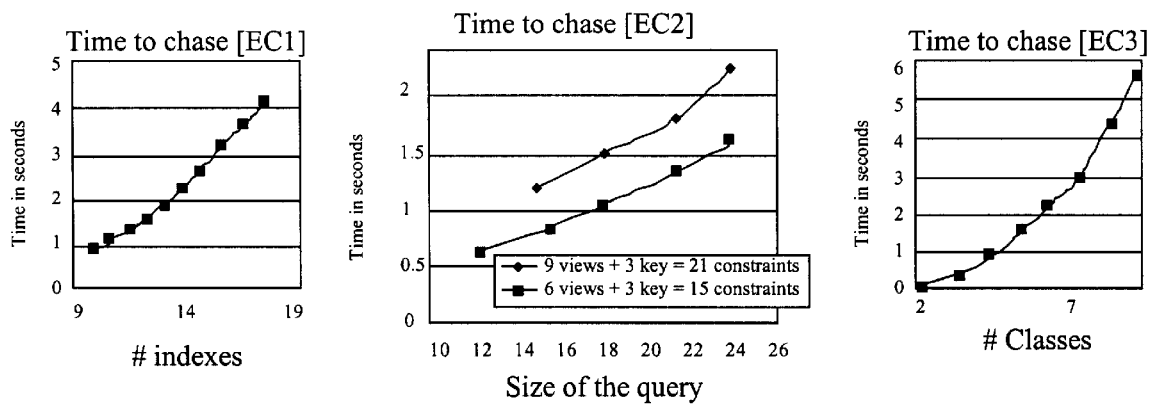
FIGS. 6A–6C are charts depicting chase time.

In EC1 (FIG. 6A) the constraints used in the chase are the ones describing the primary (2 constraints/index) and/or secondary (3 constraints/index) indexes. For example, chasing with 10 indexes, therefore 20+ constraints, takes under 1 second. For EC2 (FIG. 6B) the variable is the number of relations in the "from" clause, giving a measure of the query size. The number of constraints comes from the number of views (2 constraints/view) and the number of key constraints (1 constraint/star hub). For EC3 (FIG. 6C) the variable is the number of classes n (measuring both the size of the schema and that of the queries used). The chase is done with the inverse relationship constraints and with the ASR constraints. Chasing with 8 classes (20 constraints) takes 3 seconds. Overall, the normalized chase time grows significantly with the size of the query and the number of constraints. In comparison, numbers for the chase time are much smaller than those of the backchase.

Example 2

Backchase Feasibility

To evaluate and compare the two stratification strategies (OQF and OCS) and the full approach (FB), the following were measured:

The number of plans generated measures the completeness with respect to FB. It was found that OQF was complete for all experimental configurations considered, beyond what theorem 3 guarantees, while OCS is not complete for EC2.

The time spent per generated plan allows for a fair comparison between all three strategies. The time per plan was measured as a function of the query size and number of constraints. Moreover, the scale-up for each strategy was studied by pushing the values of the parameters to the point at which the strategy became ineffective. It was found that OQF performed much better than OCS, which in turn outperformed FB.

The effect of fragment granularity on optimization time is measured by keeping the query size constant and varying the number of strata in which the constraints are dividend. This evaluates the benefits of finding a decomposition of the query into minimal fragments. The OQF strategy performs best by achieving the minimal decomposition that does not lose plans. The results also show that OCS is a trade-off, giving up completeness for optimization time.

Example 3

Number of Generated Plans

This experiment compares for completeness the full backchase algorithm with the two previously described refinements—OQF and OCS. The number of generated plans were measured as a function of the size of the query and the number of constraints. The three strategies yielded the same number of generated plans in configurations EC1 and EC3. Table 1 shows some results for configuration EC2, in which OCS cannot produce all plans.

TABLE 1

| s | C | v | FB | OQF | OCS |
|---|---|---|----|-----|-----|
| 1 | 5 | 1 | 2  | 2   | 2   |
| 1 | 5 | 2 | 4  | 4   | 3   |
| 1 | 5 | 3 | 7  | 7   | 5   |
| 1 | 5 | 4 | 13 | 13  | 8   |
| 2 | 5 | 1 | 4  | 4   | 4   |

However, the time spent for generating the plans differs spectacularly among the three techniques, as shown by Example 4.

Example 4

Time Per Plan

This experiment compares the three backchase strategies by optimization time. Because not all strategies are complete, and hence output different numbers of plans comparison fairness is ensured by normalizing the optimization time, which was divided by the number of generated plans. This normalized measure, termed "time per plan," was measured as a function of the size of the query and the number of constraints. The results are shown in FIG. 7 and FIG. 8.

By running the experiment in configuration EC1, it was shown that for the trivial yet common case of index introduction, the performance of the algorithm of the present invention is comparable to that of standard relational optimizers.

Figure 7:
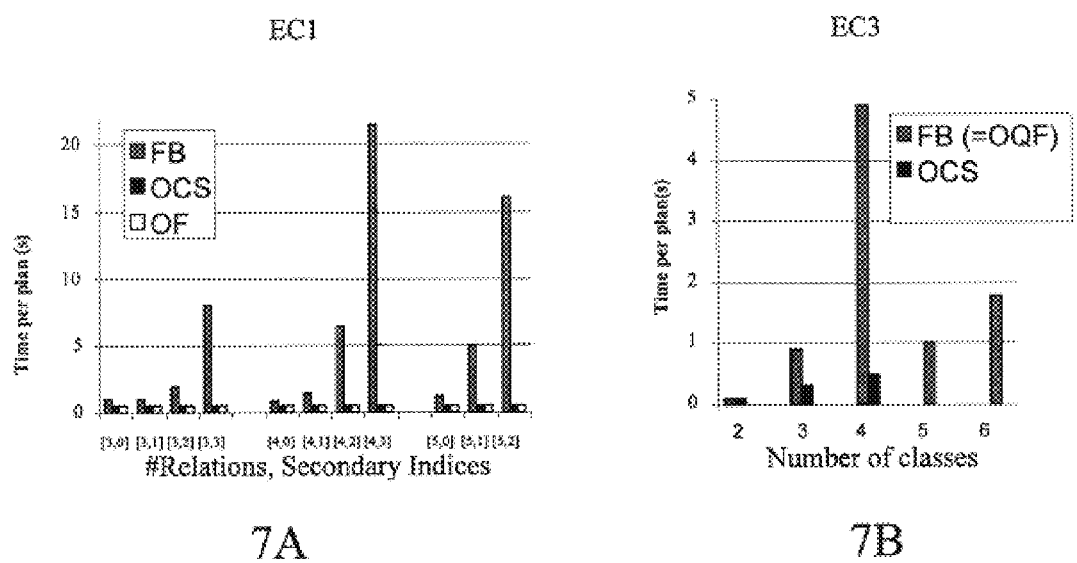
FIGS. 7A and 7B are charts depicting the comparison of FB, OQF and OCS for EC1 (FIG. 7A) in tenns of the number of relations and secondary indices; and EC3 (FIG. 7B) in terms of number of classes.

FIG. 7 shows the results obtained for three query sizes: 3, 4, and 5. By varying the number of secondary indexes for each query size, an exponential behavior was observed of the time per plan for the FB strategy, but a negligible time per plan was seen for both OQF and OCS. For configuration EC3, OQF degenerates into FB because the images of the inverse constraints overlap. FB(=OQF) and OCS were compared. OCS outperforms the other two strategies in this example because each pair of inverse constraints ends up in its own stratum. This stratification results in a linear time per plan (each stratum flips one-join direction).

Figure 8:
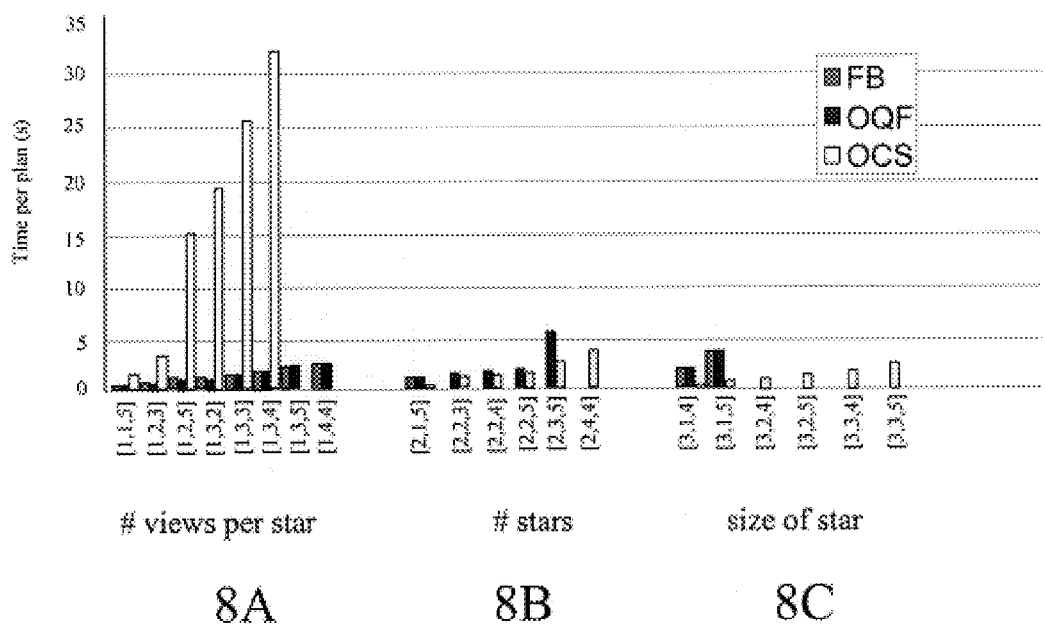
FIG. 8 is a chart presenting a comparison of FB, OQF, OCS for EC2 in terms of the number of views per star (FIG. 8A), the number of stars (FIG. 8B), and the size of the star (FIG. 8C).

The most challenging configuration is EC2, dealing with large queries and numerous constraints: the point of FIG. 8 corresponds to a query with 17 joins, 6 views (12 constraints), and 3 key constraints (see, for example, Beeri et al., *Theoretical Computer Science* 116(1):59–94 (1993); Bello et al., In *Proc. of 24$^{th}$ VLDB Conference*, pages 659–664 (1998); Chaudhuri et al., In *Proceedings of ICDE*, Taipei, Taiwan (1995)). FIG. 8 divides the points into 3 groups, each corresponding to the same number of views per star. This value determines the size of the query fragments for OQF, and is the most important factor influencing its time per plan. OCS achieves a finer stratification than OQF, but misses the best plan, which uses all the views. While all strategies exhibit exponential time per plan, OCS is fastest. FB cannot keep pace with the other two strategies. Although only time per plan is measured in this example, as opposed to the quality of the plans, the two are compared below.

Example 5

The Effect of Stratification

Figure 9:
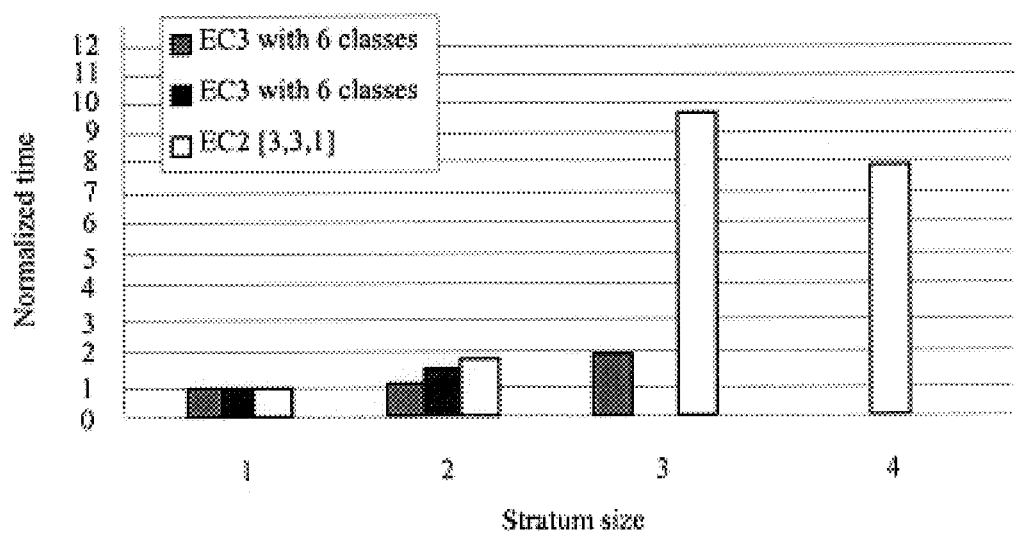
FIG. 9 is a chart depicting the effect of stratification granularity for EC2 and EC3, in terms of stratification vs. optimization time.

This experiment was run in configurations EC2 and EC3 by keeping the query size constant and varying the number of strata in which the constraints are divided. Stratum size 1 corresponds for EC3 to OCS. For EC3, two queries were considered: one navigating over 5 classes, and one over 6 classes, with 8, respectively 10 applicable constraints. The query considered in EC2 joins three stars of 3 corners each, with one view applicable per star (for a total of 9 constraints). The results are shown in FIG. 9, and exhibit exponential reduction.

Example 6

The Benefit of Optimization

To confirm that the time spent in optimization is gained back at execution time, the real query processing time (optimization time plus execution time) was measured in EC2. Rather than implement a unique query execution engine, queries were optimized using the OQF strategy and resulting plans were fed into DB2 to compare their processing times.

Parameters measured. The time taken to generate all plans was called Opt T. The execution time of the query given to DB2 in its original form (no C&B optimization) was called ExT. The DB2 execution time of the best plan generated by the C&B was called ExTBest. It was assumed that the cost of picking the best plan among those generated by the algorithm is negligible. Table 2 sets forth the details of the plans generated, and their ExT values for a setting with 3 stars, each with 2 corners and 1 view. OptT is 8s; plan 8 is the original query. For each plan, Table 2 presents the views and corner relations used (in addition to the star hubs, which appear in all plans).

TABLE 2

Generated plans.

| Plan | ExT | Views | Corner relations |
|------|-----|-------|------------------|
| 1 | 5.54s | $V_{11}, V_{21}, V_{31}$ | |
| 2 | 66.39s | $V_{11}, V_{21}$ | $S_{31}, S_{32}$ |
| 3 | 33.13s | $V_{11}, V_{31}$ | $S_{21}, S_{22}$ |
| 4 | 143.75s | $V_{11}$ | $S_{21}, S_{22}, S_{31}, S_{32}$ |
| 5 | 105.82s | $V_{21}, V_{31}$ | $S_{11}, S_{12}$ |
| 6 | 61.45s | $V_{21}$ | $S_{11}, S_{12}, S_{31}, S_{32}$ |
| 7 | 43.54s | $V_{31}$ | $S_{11}, S_{12}, S_{31}, S_{32}$ |
| 8 | 132.90s | | $S_{11}, S_{12}, S_{21}, S_{22}, S_{31}, S_{32}$ |

Performance Indices. The following performance indices are defined and displayed in FIG. 10, for increasing complexity of the experimental parameters:

$$Redux = \frac{ExT - ExTBest + OptT}{ExT}$$

$$ReduxFirst = \frac{ExT - (ExTBest + (OptT / \#plans))}{ExT}$$

"Redux" represents the time reduction resulting from optimization with respect to ExT assuming that no heuristic is used to stop the optimization as soon as reasonable. "ReduxFirst" represents the time reduction resulting from optimization with respect to ExT, assuming that a heuristic is used to return the best plan first and stop the optimization. The current implementation of OQF (similar for OCS) is able to return the best plan first for all embodiments of the present invention.

Dataset used. The selected performance indices correspond to experiments conducted on a small size database with the following characteristics:

| $R_i$ | $S_{ij}$ | $\sigma(R_i \bowtie S_{ij})$ | $\sigma(R_i \bowtie R_{i+1})$ |
|---|---|---|---|
| 5000 tup. | 5000 tup. | 4% | 2% |

On a larger database, the benefits of C&B should be even more important.

Although the current implementation of the invention is not tuned for maximum performance, thus skewing the results, using C or C++ and embedding the C&B as a built-in optimization (e.g., inside DB2) would lead to improved performance. Nevertheless, excellent results were obtained, proving that the time spent in optimization is well worth the gained execution time.

Figure 10:
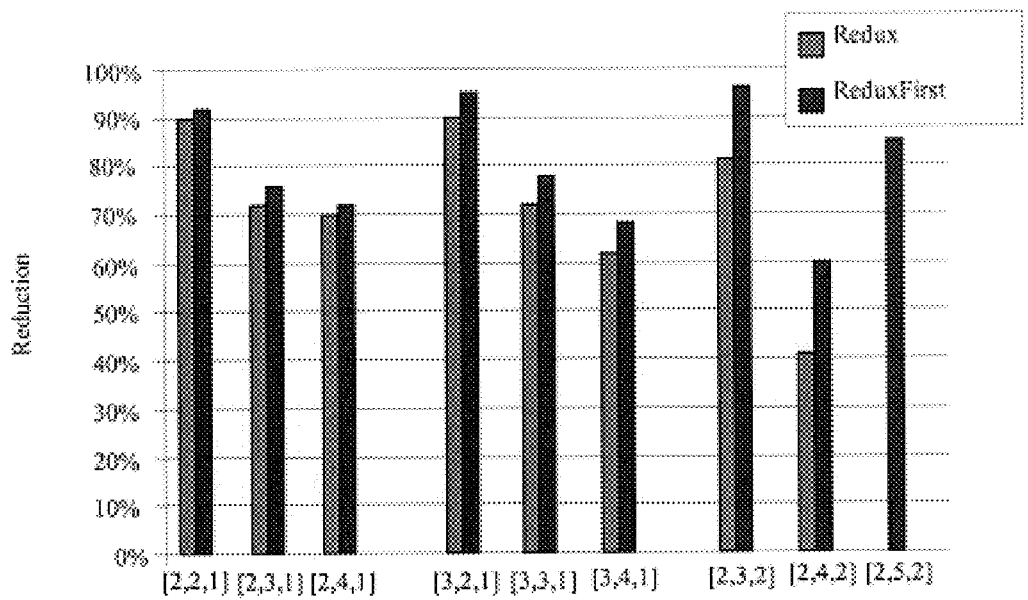
FIG. 10 is a chart illustrating for performance indices Redux and ReduxFirst, time reduction of EC2 in terms of the number of stars (FIG. 10A), the number of comer relations per star (FIG. 10B), and the number of views per star (FIG. 10C). Negative Redux is not shown.

Even without the heuristic of stopping the optimization after the first plan, the C&B posts significant time reductions (40% to 90%), up to optimizing chain of stars queries with 9 joins, using 4 views ([2, 4, 2]) in FIG. 10). The practicality range is extended even further when using the "bestplan-first" heuristic, with reductions of 60% to 95%, up to optimizing queries with 14 joins, using 6 views ([3, 4, 2] in FIG. 10).

In conclusion, at least two refinements of the full C&B algorithm have been developed and are herein exemplified: OQF, a strategy preserving completeness in restricted but common scenarios, and OCS, a heuristic which achieves the best running times. Both strategies have proven to be practical. The OQF scales reasonably well, while the OCS scales even better. The comprehensive approach to optimization of the present invention tries to exploit more optimization opportunities than previously examined common systems, thus trading optimization time for quality of generated plans. The technique clearly shows the benefits of this trade-off, even though demonstrated using a prototype, rather than an implementation tuned for high performance.

The disclosure of each and every patent, patent application and publication that is cited in the foregoing specification is herein incorporated by reference in its entirety.

While the foregoing specification has been described with regard to certain preferred embodiments, and many details have been set forth for the purpose of illustration, it will be apparent to those skilled in the art that the invention may be subject to various modifications and additional embodiments, and that certain of the details described herein can be varied considerably without departing from the spirit and scope of the invention. Such modifications, equivalent variations and additional embodiments are also intended to fall within the scope of the appended claims.

What is claimed is:

1. A method of systematically optimizing the processing of a query in a database management system that operates in a computer network, the method comprising:
   a) receiving the executable data query;
   b) producing a query plan by applying to the query a relational tableau chase procedure comprising logical constraints which capture all relevant elements for implementation mapping of the query;
   c) rewriting the query against a logical schema into an equivalent universal query plan written against a physical schema, given a semantic relationship between the logical schema and the physical schema that explicitly uses all relevant physical structures in the implementation;
   d) applying to the universal plan a sequence of backchase steps, which systematically combine use of indexes, materialized views, semantic optimization and minimization, to remove redundancies, joins and scans;
   e) generating an alternative cost-based optimal query plan; and
   f) executing said optimal query plan.

2. The method according to claim 1, wherein the method is complete.

3. The method according to claim 1, wherein the chase step (b) utilizes applicable constraints to gather all path-conjunctive queries and physical access structures relevant to the original query.

4. The method according to claim 1, wherein the backchase step (d) comprises removing data from the logical schema that is not in the physical schema.

5. The method according to claim 1, wherein the size of the search space for the backchase step (d) is minimized by reducing the size of the query, comprising fragmenting the query and stratifying the constraints by relevance to each fragment.

6. The method according to claim 1, wherein the size of the search space for the backchase step (d) is minimized by reducing the size of the constraint set, comprising splitting the constraints independent of the query.

7. The method according to claim 1, wherein the size of the search space for the backchase step (d) is minimized by reducing the size of both the query and the constraint set by partitioning into independent subparts, comprising (i) fragmenting the query and stratifying the constraints by relevance to each fragment, and (ii) splitting the constraints independent of the query.

8. The method according to claim 5, wherein all alternate plans enabled by indexes are considered.

9. A database management system, comprising:
   a database having a plurality of records;
   means for accessing and rewriting a query into a universal plan in accordance with a tableau chase procedure based on declarative constraints;
   an optimizer for optimizing a query accessing said relational database, by rewriting with the tableau chase procedure the query into a universal plan, followed by a sequence of backchase procedure steps based in part on declarative constraints which eliminate redundancies in the universal plan to reduce cost; wherein said rewrite rules are expressed in a high-level declarative language, and said query against a logical schema is rewritten into an equivalent universal query plan written against a physical schema, given a semantic relationship between the logical schema and the physical schema; wherein said optimizer uses said rewrite rules to generate query plans that are minimal in the number of scans and joins it performs;
   means for applying to said minimal query plans any cost-based query optimization procedure to produce a globally optimal plan; and
   means for executing said optimal plan.

10. The system according to claim 9, wherein the chase procedure utilizes applicable constraints to gather all path-conjunctive queries and physical access structures relevant to the original query.

11. The system according to claim 9, wherein the backchase procedure comprises means for removing data from the logical schema that is not in the physical schema.

12. The system according to claim 9, wherein the size of the search space for the backchase procedure is minimized by reducing the size of both the query and the constraint set by partitioning into independent subparts, comprising (i) means for fragmenting the query and stratifying the constraints by relevance to each fragment, and (ii) means for splitting the constraints independent of the query.

13. A query optimization system for systematically optimizing a query invoking database tables, said system comprising:

means for providing a high-level declarative language, and declarative chase and backchase rules to rewrite a query written against a logical schema into an equivalent universal query plan written against a physical schema, given a semantic relationship between the logical schema and the physical schema;

means for generating alternative queries from the query and rewrite rules;

means for generating query plans that is minimal in the number of scans and joins it performs;

means for applying to said minimal query plans any cost-based query optimization procedure to produce a globally optimal plan; and means for executing said optimal plan.

14. The system according to claim 13, wherein the chase procedure utilizes applicable constraints to gather all path-conjunctive queries and physical access structures relevant to the original query.

15. The system according to claim 13, wherein the backchase procedure comprises means for removing data from the logical schema that is not in the physical schema.

16. The system according to claim 13, wherein the size of the search space for the backchase procedure is minimized by reducing the size of both the query and the constraint set by partitioning into independent subparts, comprising (i) means for fragmenting the query and stratifying the constraints by relevance to each fragment, and (ii) means for splitting the constraints independent of the query.

17. An apparatus for use in systematically optimizing a query in a database system, wherein the apparatus comprises:

memory for storing at least one data item referenced by the query; and a processor coupled to the memory and operative to (i) systematically apply to the query a tableau chase procedures and a sequence of backchase procedure steps based in part on declarative constraints along with one or more algebraic rewritings based on explicit substitutions in order to generate a rewritten universal query plan and rewritten query plans that are minimal in the number of scans and joins performed, which are equivalent to the query, wherein each of at least a subset of equivalent substitutions represents a hypothetical database change; (ii) applying to said minimal query plans any cost-based query optimization procedure to produce a globally optimal plan; and (iii) execute said optimal plan.

18. The apparatus according to claim 17, wherein the chase procedures utilize applicable constraints to gather all path-conjunctive queries and physical access structures relevant to the original query.

19. The apparatus according to claim 17, wherein the backchase procedure steps comprise removing data from the logical schema that is not in the physical schema.

20. The apparatus according to claim 17, wherein the size of the search space for the backchase procedure steps is minimized by reducing the size of both the query and the constraint set by partitioning into independent subparts, comprising (i) fragmenting the query and stratifying the constraints by relevance to each fragment, and (ii) splitting the constraints independent of the query.

* * * * *